US006955338B2

(12) United States Patent
Okumura et al.

(10) Patent No.: US 6,955,338 B2
(45) Date of Patent: Oct. 18, 2005

(54) AIR-PASSAGE OPENING/CLOSING DEVICE

(75) Inventors: Yoshihiko Okumura, Kariya (JP); Katsumi Nishikawa, Kariya (JP); Takahiro Tokunaga, Kosai (JP); Koji Ito, Nagoya (JP); Yasuhiro Sekito, Kariya (JP)

(73) Assignee: DENSO Corporation, Kariya (JP)

(*) Notice: Subject to any disclaimer, the term of this patent is extended or adjusted under 35 U.S.C. 154(b) by 182 days.

(21) Appl. No.: 10/397,124

(22) Filed: Mar. 26, 2003

(65) Prior Publication Data

US 2003/0232590 A1 Dec. 18, 2003

(30) Foreign Application Priority Data

| | | |
|---|---|---|
| Mar. 27, 2002 | (JP) | 2002-088831 |
| Dec. 3, 2002 | (JP) | 2002-351215 |
| Feb. 6, 2003 | (JP) | 2003-029597 |

(51) Int. Cl.[7] .......... F16K 7/18

(52) U.S. Cl. .......... 251/249.5; 251/250; 251/901; 454/156

(58) Field of Search .......... 251/249.5, 250, 251/331, 901; 454/274, 334, 156

(56) References Cited

U.S. PATENT DOCUMENTS

| | | | | | |
|---|---|---|---|---|---|
| 1,138,994 | A | * | 5/1915 | Steele | 251/901 |
| 1,924,419 | A | * | 8/1933 | Sinden | 251/901 |
| 3,773,077 | A | * | 11/1973 | Barnebey | 251/901 |
| 4,084,617 | A | * | 4/1978 | Happe | 251/901 |
| 4,147,183 | A | * | 4/1979 | Kalsi | 251/901 |
| 4,484,728 | A | * | 11/1984 | Moore | 251/901 |
| 5,236,124 | A | * | 8/1993 | Orbesen | 251/901 |
| 5,238,023 | A | * | 8/1993 | Olofsson | 251/901 |
| 6,173,640 | B1 | * | 1/2001 | Jacobsen et al. | 251/901 |

FOREIGN PATENT DOCUMENTS

JP 5-238244 9/1993

* cited by examiner

Primary Examiner—Eric Keasel
(74) *Attorney, Agent, or Firm*—Harness, Dickey & Pierce, PLC

(57) ABSTRACT

An air passage opening/closing device includes a film member for opening and closing an opening of an air passage of a case. One end of the film member is fixed to a fixing portion on an outer periphery of the opening of the air passage, and the other end thereof is connected to a film winding shaft. A moving member movable by rotation of a drive shaft is provided on the opening, and the film winding shaft is moved while being rotated by the movement of the moving member, so that the film member at the other end side is wound around and unwound from the film winding shaft. Accordingly, when the air passage is opened and closed by the film member, sliding friction can be prevented from being generated between the film member and the case.

15 Claims, 16 Drawing Sheets

AIR-PASSAGE OPENING/CLOSING DEVICE

CROSS-REFERENCE TO RELATED APPLICATION

This application is related to and claims priority from Japanese Patent Applications No. 2002-88831 filed on Mar. 27, 2002, No. 2002-351215 filed on Dec. 3, 2002 and No. 2003-29597 filed on Feb. 6, 2003, the contents of which are hereby incorporated by reference.

BACKGROUND OF THE INVENTION

1. Field of the Invention

The present invention relates to an air passage opening/closing device which opens and closes an air passage by using a film member (a film door). The air passage opening/closing device is suitably used for a vehicle air conditioner.

2. Related Art

An air passage opening/closing device, which opens and closes an air passage by using a film member, is proposed in JP-A-5-23824 and the like. In this related art, both ends of a film member having an opening are attached to film winding shafts rotatably mounted in an air conditioning case. Further, the film member is moved in an air passage of the air conditioning case by the film winding shafts. However, in this case, the film member slides on the air conditioning case around an opening portion of the air passage. Therefore, friction force, generated between the film member and the air conditioning case, is necessarily applied to the film member. Furthermore, because the film member is pushed to the opening portion by pressure of the blown air, the friction force of the film member due to the sliding of the film member is further increased. As a result, a special material, which has low friction, and large tensile strength and large tear strength against the friction force, is required to be used as the film member, thereby increasing production cost of the film member. Further, because drive force for moving the film member is increased due to the sliding friction force of the film member, a high torque actuator is required for driving the film member, thereby further increasing production cost of the air passage opening/closing device.

SUMMARY OF THE INVENTION

In view of the above problem, it is an object of the present invention to provide an air passage opening/closing device with a new operation mechanism for operating a film member.

It is another object of the present invention to provide an air passage opening/closing device including a film member, which can prevent sliding friction from being generated between the film member and a unit case when an air passage in the unit case is opened and closed by the film member.

According to the present invention, an air passage opening/closing device includes a case for defining an air passage therein, a film member disposed in the case for opening and closing the opening of the air passage, a fixing portion for fixing one end of the film member to the case on an outer periphery of the opening, and an operation mechanism capable of moving on the opening of the air passage in a first direction separated from the fixing portion and in a second direction approaching the fixing portion. In this device, the operation mechanism changes a length of the film member from the one end of the film member by the movement of the operation mechanism on the opening of the air passage. Accordingly, the film member does not slide on the outer periphery of the opening of the air passage, and the film member is not required to be made of a special material having large tensile strength and large tear strength against sliding friction force. Therefore, the film member can be made of a material with low cost. Further, because sliding friction force of the film member is not generated, driving force for moving the film member can be largely reduced. Thus, a low-torque actuator can be used as an actuator for driving the film member. Further, when the film member is driven by manual operation, the manual operation force can be reduced.

Preferably, the operation mechanism includes a film winding shaft to which the other end of the film member opposite to the one end is connected, and a moving mechanism for moving the film winding shaft on the outer periphery of the opening in the first direction and in the second direction while rotating the film winding shaft. Further, the film member at a side of the other end is wound around the film winding shaft, and is unwound from the film winding shaft. Therefore, the film member effectively opens and closes the opening of the air passage without a sliding friction between the film member and the case.

Further, a slip prevention mechanism for preventing a rotational slip between the film winding shaft and the case can be provided. In this case, the rotational slip of the film winding shaft can be effectively prevented, and the rotation operation of the film winding shaft can be accurately performed. Specifically, the slip prevention mechanism includes a first gear provided on the film winding shaft, and a second gear provided on the case to be engaged with the first gear.

Preferably, the operation mechanism further includes a rotational-angle adjusting mechanism for adjusting a rotational angle of the film winding shaft so as to compensate a diameter change of the film member wound around the film winding shaft. In this case, even when the wound diameter of the film member changes, the wound length and the wound off length of the film member per rotational angle of the film winding shaft can be suitably adjusted. Thus, it can restrict the film member from being loosed, and noise due to insufficient sealing can be prevented. For example, the rotational-angle adjusting mechanism is disposed for adjusting a phase difference between a moving distance of the moving mechanism and the rotational angle of the film winding shaft. In this case, the rotational-angle adjusting mechanism includes a first gear provided on the film winding shaft, and a second gear provided in the case to be engaged with the first gear. Further, the second gear is provided such that a pitch of the second gear is made larger as the diameter of the film member wound around the film winding shaft becomes larger.

Alternatively, the rotational-angle adjusting mechanism is a spring member disposed between the moving mechanism and the film winding shaft. For example, the spring member is a coil spring for continuously applying a spring force of the spring member to a portion between the moving mechanism and the film winding shaft in an entire moving region of the film winding shaft.

According to the present invention, in an air passage opening/closing device, a drive shaft for driving the film member is disposed rotatably, and a loop-shaped rotation transmitting member is disposed for transmitting rotation of the drive shaft to the film winding shaft and for moving the film winding shaft on the outer periphery of the opening in the first direction and in the second direction while rotating the film winding shaft. Even in this case, when the film winding shaft moves in the first direction, the film member is unwound from the film winding shaft at the side of the other end. On the other hand, when the film winding shaft moves in the second direction toward the fixing portion, the film member is wound around the film winding shaft at the side of the other end. Accordingly, the sliding friction between the film member and the case can be prevented.

Preferably, the loop-shaped rotation transmitting member is a belt having a gear that is engaged with both of the drive shaft and the film winding shaft. Alternatively, the loop-shaped rotation transmitting member is a chain having a gear that is engaged with both of the drive shaft and the film winding shaft. Alternatively, the loop-shaped rotation transmitting member is a belt for transmitting the rotation of the drive shaft to the film winding shaft by using friction between the belt and the drive shaft and friction between the belt and the film winding shaft.

According to present invention, in an air passage opening/closing device, the drive shaft for driving the film member has a worm portion being engaged with a worm wheel of the film winding shaft. In this case, by an engagement between the worm portion and the worm wheel, the film winding shaft moves on the outer periphery of the opening in the first direction and in the second direction while being rotated. Even in this case, the film member is wound around and unwound from the film winding shaft at the side of the other end. Therefore, the same advantage described above can be obtained.

According to the present invention, in an air passage opening/closing device, the drive shaft is disposed on a plane where the film winding shaft is disposed, the drive shaft is disposed to extend perpendicular to the film winding shaft. Further, the drive shaft press-contacts an end of the film winding shaft so that a pushing force due to rotation of the drive shaft is applied to the end of the film winding shaft, and the film winding shaft is movable on the outer periphery of the opening in the first direction and in the second direction while being rotated by the pushing force applied to the end of the film winding shaft. Even in this case, the film member is wound around and unwound from the film winding shaft at the side of the other end. Therefore, the size of the case can be effectively reduced while the same advantage described above can be obtained.

When the film member is unwound from the film winding shaft at the side of the other end while the film winding shaft moves in the first direction, a part of the film member is separated from a seal surface of the case around the opening of the air passage in a protrusion shape due to a wound habit of the film member. However, in the present invention, the seal surface is bent in accordance with the protrusion shape of the film member to protrude in the same direction as the protrusion shape of the film member. Therefore, it can effectively restrict air leakage from being generated, thereby preventing noise due to vibration of the film member.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Figure 1:
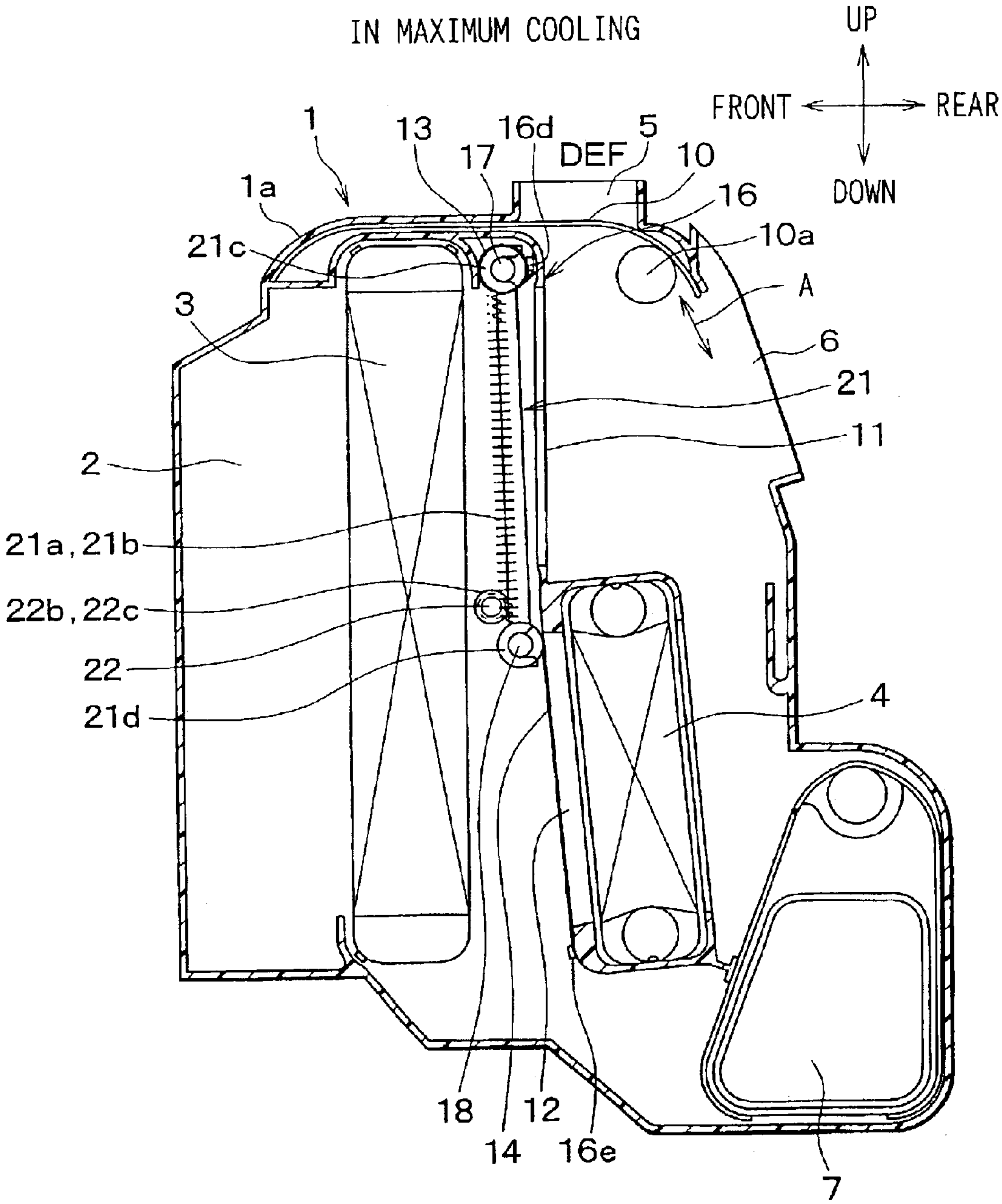
FIG. 1 is a cross-sectional view showing a vehicle air conditioner, in a maximum cooling, including an air passage opening/closing device according to a first embodiment of the present invention.

Preferred embodiments of the present invention will be described hereinafter with reference to the appended drawings.

(First Embodiment)

The first embodiment of the present invention will be now described with reference to FIGS. 1–5. In the first embodiment, an air passage opening/closing device according to the present invention is typically used for a vehicle air conditioner. As shown in FIGS. 1–4, an air conditioning unit 1 of a vehicle air conditioner includes a resinous air conditioning case 1*a*. The air conditioning case 1*a* is disposed inside a dashboard in a passenger compartment at an approximately center in a vehicle width direction (right-left direction). Further, the air conditioning unit 1 is mounted in the vehicle to correspond to the arrangement direction in FIGS. 1–4 in a vehicle front-rear direction, in a vehicle up-down direction and in a vehicle right-left direction. An air inlet space 2, into which air blown by a blower unit (not shown) flows through a connection duct 1*b* shown in FIG. 4, is formed at a front most side in the air conditioning case 1*a*. In a vehicle having a right steering wheel, the connection duct 1*b* is connected to a surface of the air conditioning case 1*a* at a front-passenger's seat side (vehicle left side). An air outlet of the blower unit, which is disposed inside the dashboard at the front-passenger's seat side, is connected to the connection duct 1*b*. Thus, when a blower of the blower unit is operated, air blown by the blower flows from the connection duct 1*b* into the air inlet space 2.

An evaporator 3 and a heater core 4 are disposed in the air conditioning case 1*a* in this order from an upstream air side to a downstream air side. The evaporator 3 is provided in a refrigerating cycle, and is a cooling heat exchanger for cooling the blown air. Refrigerant in the evaporator 3 absorbs heat from air flowing therethrough in the air conditioning case 1*a*, so that the refrigerant is evaporated and air passing through the evaporator 3 is cooled. The heater core 4 is a heating heat exchanger for heating air passing therethrough in the air conditioning case 1*a* by using hot water (engine-cooling water) from a vehicle engine as a heating source.

Plural blow openings 5–9 are provided in the air conditioning case 1*a* at a downstream air side. A defroster opening 5 is provided on an upper surface of the air conditioning case 1*a*, and a defroster duct (not shown) is connected to the air conditioning case 1*a* at the defroster opening 5. Conditioned air is blown from a defroster air outlet provided at a downstream end of the defroster duct toward an inner surface of a windshield in the passenger compartment. A front-seat face opening 6 is disposed on a vehicle rear side surface of the air conditioning case 1*a* at an upper portion, and a face duct (not shown) is connected to the air conditioning case 1*a* at the front-seat face opening 6. The conditioned air is blown from a face air outlet disposed at a downstream end of the face duct toward the upper half bodies of a passenger and a driver in front seats.

A front-seat foot opening 7 is disposed on the vehicle rear side surface of the air conditioning case 1*a* at right and left sides of a lower portion, and the conditioned air is blown toward the foot portions of the passenger and the driver in the front seats through the front-seat foot opening 7. Further, as shown in FIG. 4, a rear-seat face duct (not shown) is connected to the air conditioning case 1*a* at a rear-seat face opening 8. The conditioned air is blown from the rear-seat face duct toward upper sides in rear seats. A rear-seat foot duct (not shown) is connected to the air conditioning case 1*a* at a rear-seat foot opening 9. The conditioned air is blown from the rear-seat foot duct toward lower sides in the rear seats.

In the first embodiment, a blow-mode film member 10 is disposed to open and close the defroster opening 5 and the surface opening 6. The blow-mode film member 10 reciprocates by rotation of a drive gear 10*a* in a direction indicated by an arrow A in FIG. 1 so as to open and close the openings 5, 6. The other openings 7–9 are opened and closed by the other door members (not shown), in the first embodiment.

Figure 2:
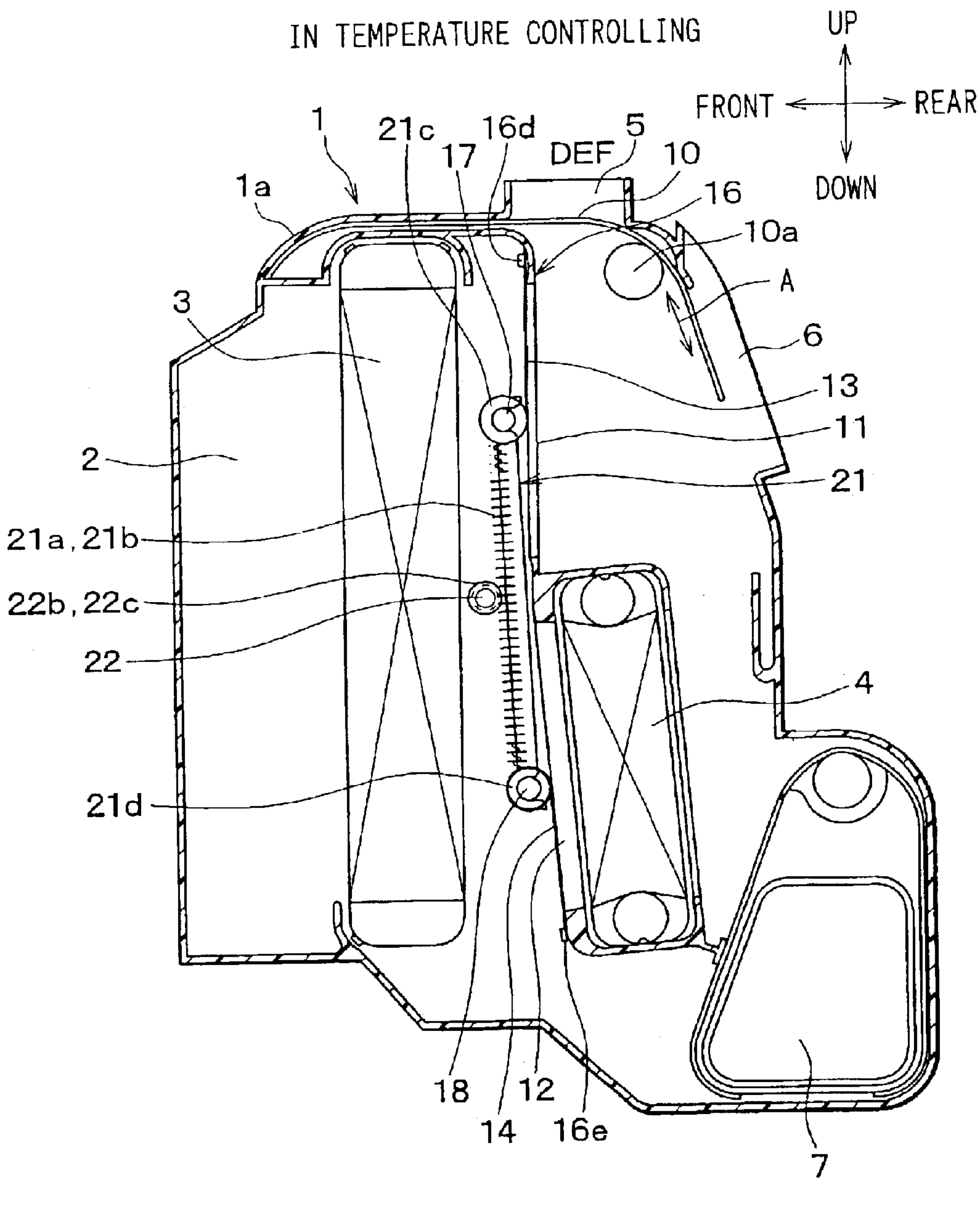
FIG. 2 is a cross-sectional view showing the vehicle air conditioner, in a temperature controlling, including the air passage opening/closing device according to the first embodiment.
Figure 3:
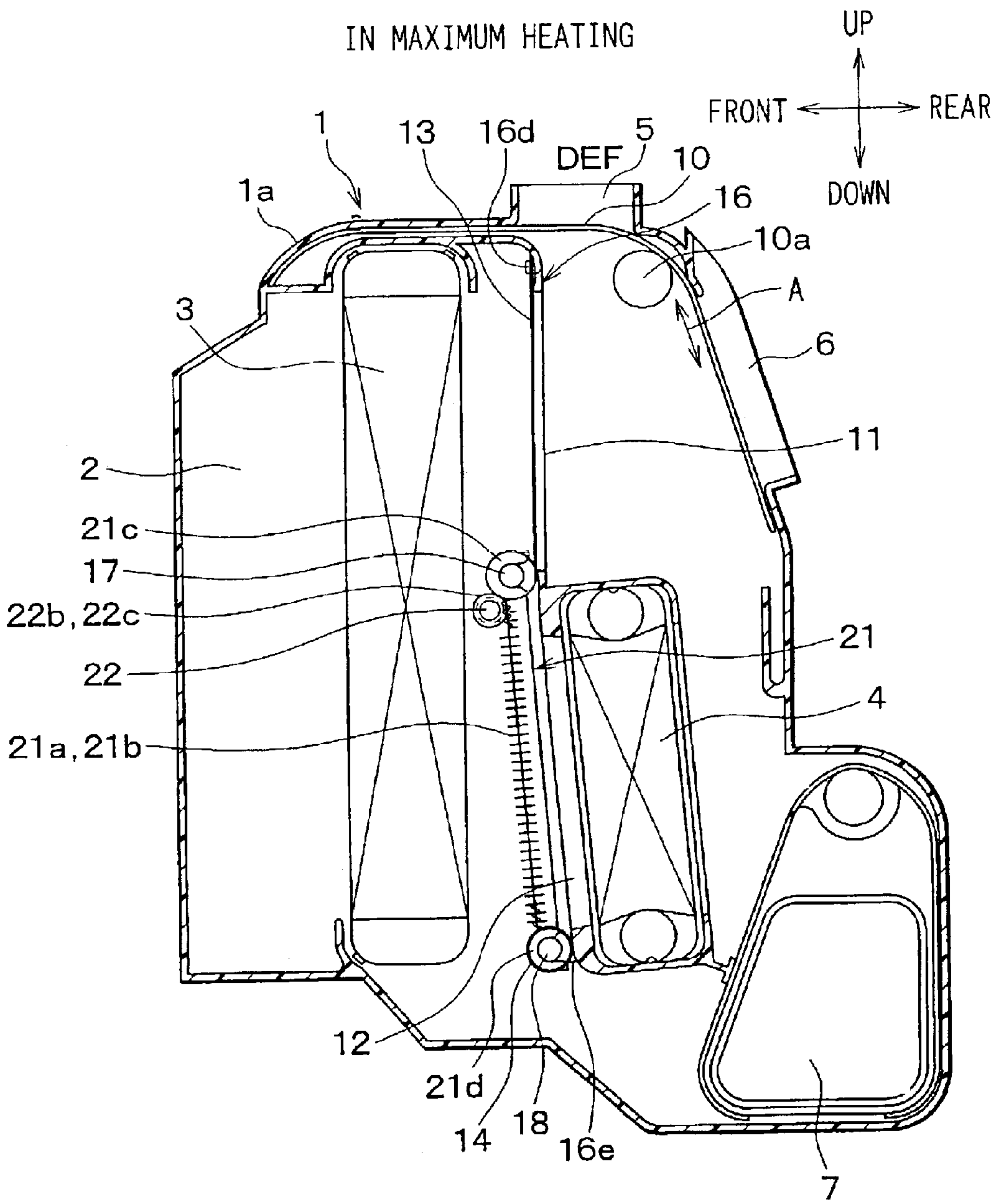
FIG. 3 is a cross-sectional view showing the vehicle air conditioner, in a maximum heating, including the air passage opening/closing device according to the first embodiment.
Figure 4:
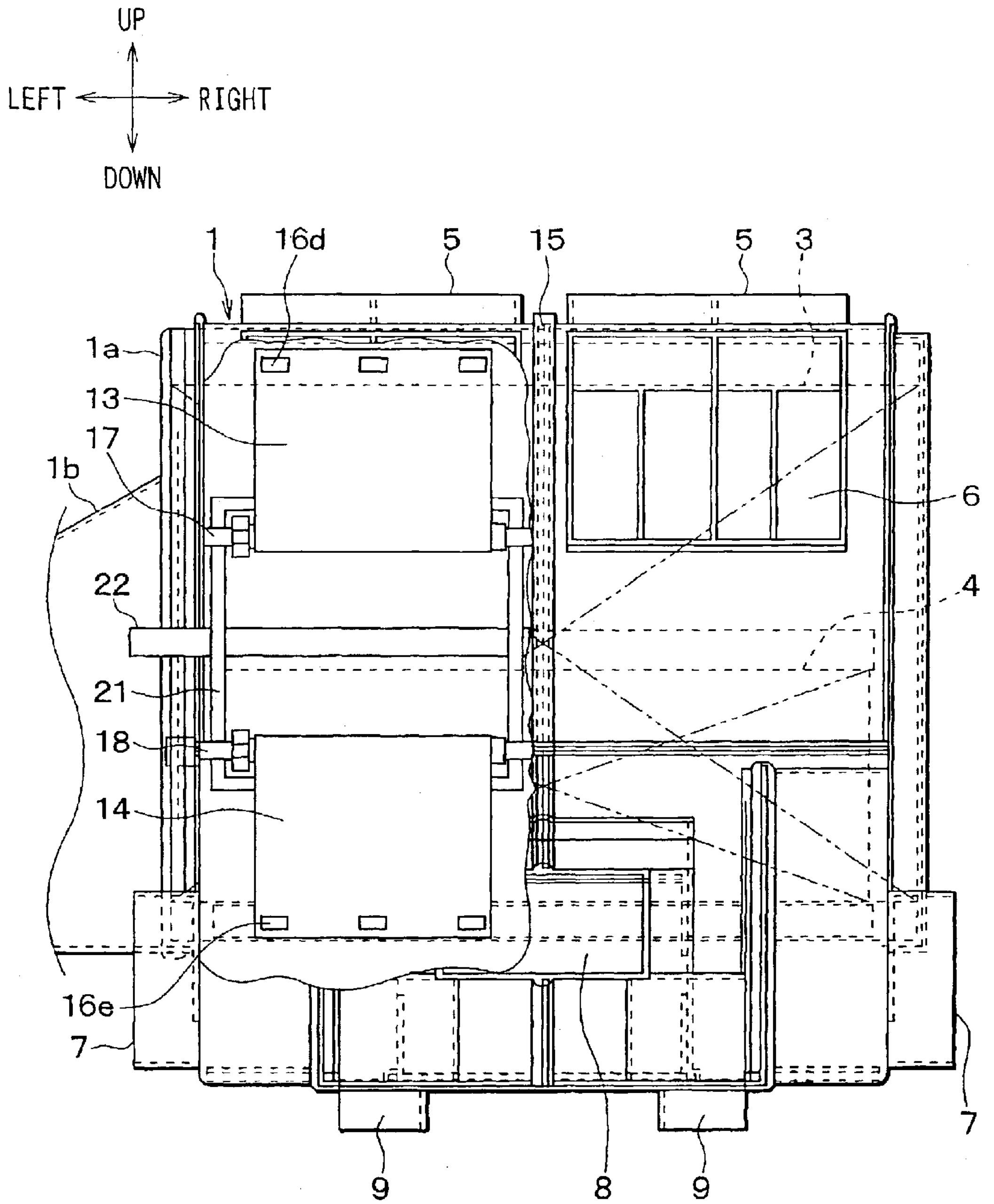
FIG. 4 is a front view showing a main part of the vehicle air conditioner including the air passage opening/closing device according to the first embodiment.

As shown in FIGS. 1–3, a cool air passage 11, through which cool air from the evaporator 3 flows while bypassing the heater core 4, is provided above the heater core 4 in the air conditioning case 1*a*. A warm air passage 12, through which air flows into the heater core 4, is provided below the cool air passage 11 in parallel to the cool air passage 11. A mixing ratio between the cool air passing through the cool air passage 11 and warm air passing through the warm air passage 12 is adjusted, so that a temperature of air to be blown into the passenger compartment is adjusted. As a temperature adjusting device for adjusting the air temperature to be blown into the passenger compartment, a cool air film member 13 for adjusting an open degree of the cool air passage 11 and a warm air film member 14 for adjusting an open degree of the warm air passage 12 are provided in the air conditioning case 1*a*.

In the first embodiment, an air passage in the air conditioning case 1*a* is partitioned by a partition plate 15 into a first passage (right passage at the driver's seat side) and a second passage (left passage at the front passenger's seat side). The film members 13, 14 are provided in each of the first passage and the second passage. The film members 13, 14 in the first passage and the film members 13, 14 in the second passage are operated independently from each other between the two passages. Thus, the temperature of air to be blown toward the driver's seat side (right side) in the passenger compartment and the temperature of air to be blown toward the front passenger's seat side (left side) in the passenger compartment can be adjusted independently from each other. An operation mechanism of the film members 13, 14 at the driver seat side can be made identical to an operation mechanism of the film members 13, 14 at the front passenger's seat side. In FIG. 4, the operation mechanism is shown only at the front passenger's seat side (left side) to simplify the drawing. The operation mechanism to be described hereinafter can be commonly used for the film members 13, 14 at the driver's seat side and for the film members 13, 14 at the front-passenger's seat side.

Figure 5:
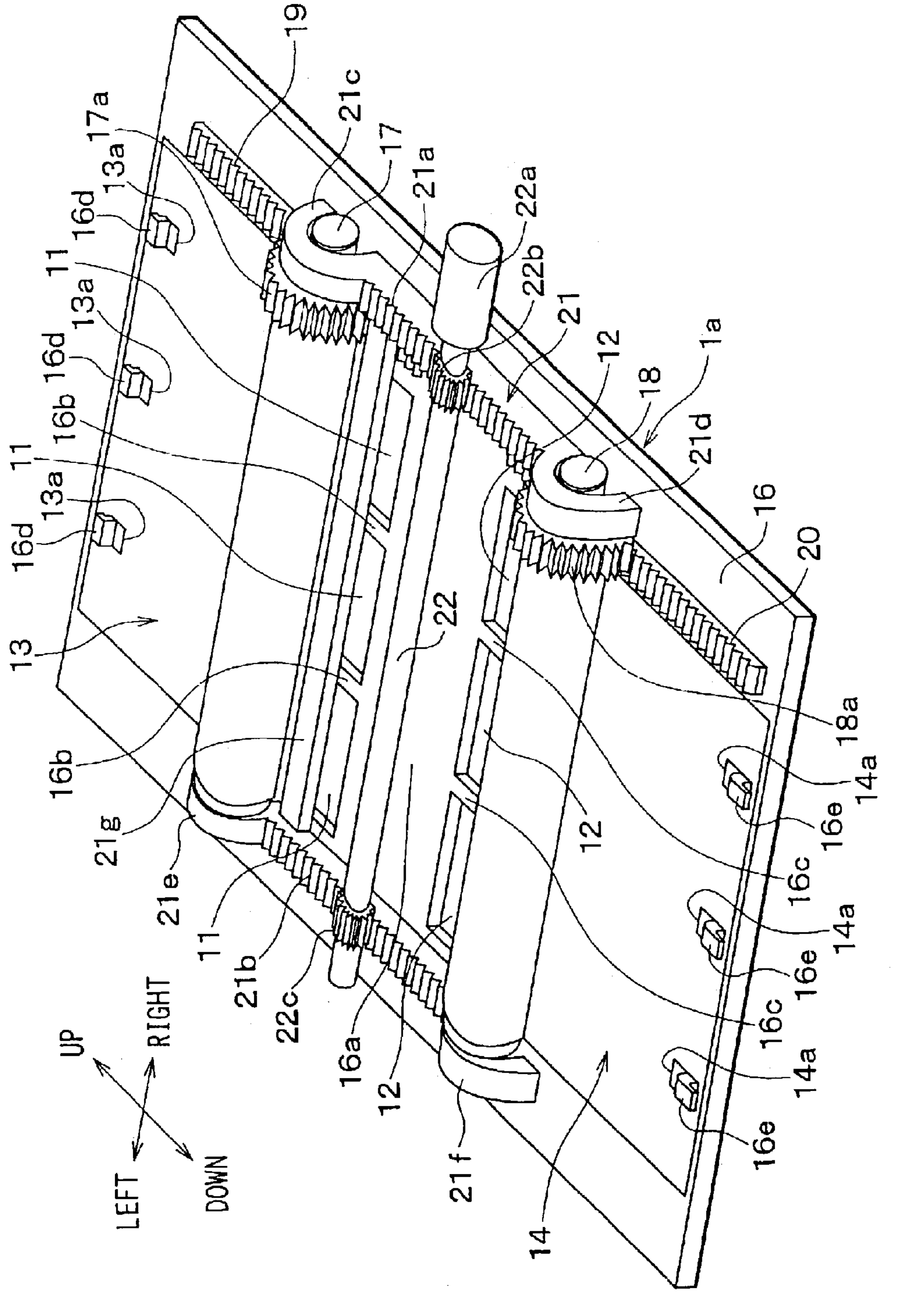
FIG. 5 is a perspective view showing a main part of the air passage opening/closing device according to the first embodiment.

Specifically, the operation mechanism of the film members 13, 14 is shown in FIG. 5. An opening of the cool air passage 11 and an opening of the warm air passage 12 are provided in an opening forming member 16, and the opening forming member 16 is disposed in the air conditioning case 1*a*. As shown in FIG. 5, the opening forming member 16 is generally a plate-like member, and can be integrated to the air conditioning case 1*a*. The opening forming member 16 includes a partitioning portion 16*a*, and has the opening of the cool air passage 11 above the partitioning portion 16*a* and the opening of the warm air passage 12 below the partitioning portion 16*a*. As shown in FIGS. 1–3, the film members 13, 14 are disposed upstream of the opening forming member 16 in an air flow direction, so that the film members 13, 14 can be pushed to a surface of the opening forming member 16 by the pressure of the blown air.

As shown in FIG. 5, grid portions 16*b*, 16*c*, extending in the up-down direction, are integrated to the opening forming member 16 by molding, so that each of the openings of the cool air passage 11 and the warm air passage 12 is partitioned into three portions in the vehicle width direction. Thus, each center area of the film members 13, 14 in the vehicle width direction can be also supported by the grid portions 16*b*, 16*c*. Therefore, the center areas of the film members 13, 14 can be prevented from being largely curved to the downstream air side by the pressure of the blown air. The opening forming member 16 includes fixing portions 16*d*, 16*e*. The fixing portions 16*d* fix an upper end of the cool air film member 13 to the opening forming member 16 at an upper periphery portion of the opening portion of the cool air passage 11. Further, the fixing portions 16*e* fix a lower end of the warm air film member 14 to the opening forming member 16 at a lower periphery portion of the opening portion of the warm air passage 12. The fixing portions 16*d*, 16*e*, each having an approximate L-shape, are inserted into and engaged with clamp holes 13*a*, 14*a* provided in end portions of the film members 13, 14. Thus, the upper end portion of film member 13 and the lower end portion of the film member 14 are fixed to the opening forming member 16.

A lower end of the cool air film member 13 is fixed to a cool-air film winding shaft 17, and an upper end of the warm air film member 14 is fixed to a warm-air film winding shaft 18. The film winding shafts 17, 18 are disposed upstream of the opening forming member 16 in parallel with each other so as to extend in the vehicle width direction. The film winding shafts 17, 18 are made of resin, and circular gears 17*a*, 18*a* are integrated by resin molding to the film winding shafts 17, 18 at the right ends, respectively. Further, linear gears 19, 20, with which the circular gears 17*a*, 18*a* of the film winding shafts 17, 18 are engaged, respectively, are integrated to an upstream surface of the opening forming member 16 at right side peripheries of the cool air passage 11 and the warm air passage 12.

Two ends of each film winding shaft 17, 18 are supported by a moving member 21, and the movement of the film winding shafts 17, 18 is coupled with the movement of the moving member 21. At this time, the film winding shafts 17, 18 move in the up-down direction at the upstream side of the opening forming member 16. Specifically, the film winding shafts 17, 18 rotate by 360 degrees or more by the engagement between the circular gears 17*a*, 18*a* and the linear gears 19, 20. The moving member 21 includes linear gears 21*a*, 21*b*, located at right and left side ends of the cool air passage 11 and the warm air passage 12, on its upstream surface.

The linear gears 21*a*, 21*b* are provided with circular shaft holders 21*c*–21*f* at their both ends in the up-down direction, and both ends of the film winding shafts 17, 18 are rotatably fitted in and held by the shaft holders 21*c*–21*f*. The linear gears 21*a*, 21*b* are integrally connected to each other by plural connection portions 21*g*. In FIG. 5, only the connection portion 21*g* at the cool air passage 11 is shown, and the connection portion 21*g* at the warm air passage 12 is omitted. The moving member 21 is a resinous rigid component, and the linear gears 21*a*, 21*b*, the shaft holders 21*c*–21*f* and the connection portions 21*g* are integrally molded by resin.

A drive shaft 22 is made of resin, and is rotatably supported at its two ends by bearing holes (not shown) provided on right and left side surfaces of the air conditioning case 1*a*. A large diameter portion 22*a* of the drive shaft 22 protrudes outside the air conditioning case 1*a*, and is connected to an output shaft of an actuator (not shown) such as a step motor. Thus, the drive shaft 22 is rotated by a predetermined angle by rotation of the actuator. Circular gears 22*b*, 22*c*, engaging with the linear gears 21*a*, 21*b* of the moving member 21, are molded integrally with two end portions of the drive shaft 22. The moving member 21 contacts the upstream surface of the opening forming member 16, and reciprocates in the up-down direction while being guided by the opening forming member 16.

The film members 13, 14 are formed from a flexible resin film capable of being wound by the film winding shafts 17, 18, such as a polyethylene terephthalate (PET) film and a polyphenylene sulfide (PPS) film. Further, a textile may be bonded to a film. For example, the thickness of film members 13, 14 is approximately 200 μm.

Next, operation in the first embodiment will be described. In a maximum cooling shown in FIG. 1, the drive shaft 22 is rotated by the actuator (not shown), and the moving member 21 moves to its highest position. The film winding shafts 17, 18 also are moved to their highest portions by the movement of the moving member 21. As a result, all the cool-air film member 13 is wound around the cool-air winding shaft 17, so that the cool-air film member 13 entirely opens the opening of the cool air passage 11. On the other hand, the warm-air film member 14 is wound off (unwound) from the warm-air winding shaft 18, so that the warm-air film-member 14 entirely closes the opening of the warm air passage 12. At this time, the warm-air film member 14 is pushed to the upstream surface of the opening forming member 16 by the pressure of the blown air, thereby surely sealing the opening of the warm air passage 12.

Accordingly, air blown by the blower unit is cooled by the evaporator 3 in the air conditioning case 1*a*, and all the cooled air (cool air) passes through the cool air passage 11. Therefore, the temperature of air, to be blown from the blower openings 5–9 into the passenger compartment, can be adjusted at the lowest temperature, thereby improving maximum cooling performance.

In a temperature control operation shown in FIG. 2, the temperature of air, to be blown into the passenger compartment, is adjusted in an intermediate temperature region. Here, the drive shaft 22 is rotated by the actuator (not shown), and the moving member 21 moves downward by a predetermined distance from its highest position. The film winding shafts 17, 18 also are moved to their intermediate portions by the movement of the moving member 21. At this time, the film winding shafts 17, 18 move downward from the highest positions while being rotated due to the engagement between the circular gears 17*a*, 18*a* and the linear gears 19, 20. Thus, an approximately half of the cool-air film member 13 is unwound from the cool-air winding shaft 17, so that the cool-air film member 13 closes an approximately upper half of the opening of the cool air passage 11, and opens an approximately lower half thereof. On the other hand, an approximately half of the warm-air film member 14 is wound around the warm-air winding shaft 18, so that the warm-air film member 14 opens an approximately upper half of the opening of the warm air passage 12, and closes an approximately lower half thereof.

As a result, an approximately half of the air, cooled by the evaporator 3, passes through an approximately lower half of the opening of the cool air passage 11 while bypassing the heater core 4. The residual of the air (cool air) passes through an approximately upper half of the opening of the warm air passage 12, and flows into the heater core 4. The air, heated by the heater core 4, flows downstream of the heater core 4 upwardly, and is mixed with the cool air from the cool air passage 11, thereby forming the conditioned air having the desired temperature. The conditioned air having the desired temperature is blown from the blow openings 5–9 into the passenger compartment.

In a maximum heating shown in FIG. 3, the drive shaft 22 is rotated by the actuator (not shown), and the moving member 21 moves to its lowest position. The film winding shafts 17, 18 also are moved to their lowest portions by the movement of the moving member 21. As a result, all the cool-air film member 13 is wound off from the cool-air winding shaft 17, so that the cool-air film member 13 entirely closes the opening of the cool air passage 11. At this time, the cool-air film member 13 is pushed to the upstream surface of the opening forming member 16 by the pressure of the blown air, thereby surely sealing the opening of the cool air passage 11. On the other hand, the maximum amount of the warm-air film member 14 is wound around the warm-air winding shaft 18, so that the warm-air film member 14 entirely opens the opening of the warm air passage 12.

Accordingly, air blown by the blower unit passes through the evaporator 3 in the air conditioning case 1*a*, and thereafter passes through the warm air passage 12 of the heater core 4. Then, all the air from the evaporator 3 flows into the heater core 4. Therefore, the temperature of air, to be blown from the blower openings 5–9 into the passenger compartment, can be adjusted at the highest temperature, thereby improving maximum heating performance.

Next, advantages according to the first embodiment will be described. One end of the cool-air film member 13 is fixed to the opening forming member 16, and the cool-air film member 13 at the other end side is wound around or wound off from the cool-air film winding shaft 17, thereby opening and closing the opening of the cool air passage 11. Therefore, the cool-air film member 13 only at the other end side moves on the opening forming member 16, but the cool-air film member 13 does not slide on the opening forming member 16. Thus, sliding friction is not generated between the cool-air film member 13 and the opening forming member 16, and the cool-air film member 13 does not require large tensile strength and large tear strength against sliding friction force. Similarly, the warm-air film member 14 does not require large tensile strength and large tear strength against the sliding friction force. As a result, a resin film such as the PET film and the PPS film can be used as it is as the film members 13, 14, thereby largely reducing production cost of the film members 13, 14. Accordingly, a high-cost special material is unnecessary.

For example, in the prior art, a textile is bonded to a resin film such as the PET film and the PPS film to obtain the large tensile strength and the large tear strength against the sliding friction force. Otherwise, a silicone coated surface with a low friction is provided on the resin film. Therefore, in this case, the production cost of the film member is largely increased.

According to the first embodiment, because the sliding friction is not generated on the film members 13, 14, noise due to the sliding friction can be also prevented from being caused.

In addition, the film members 13, 14 are driven by only rolling force, thereby largely reducing drive force for driving the film members 13, 14 as compared with the driving force in the prior art. Therefore, in the first embodiment, a relatively small power actuator can be used as the actuator for driving the film members 13, 14, thereby reducing production cost and the size of the actuator. Further, the circular gears 17*a*, 18*a* of the film winding shafts 17, 18 are engaged with the linear gears 19, 20 of the opening forming member 16. Therefore, the film winding shafts 17, 18 can be accurately rotated in accordance with the movement of the moving member 21, thereby preventing the film winding shafts 17, 18 from slipping.

In the first embodiment, the film members 13, 14 are prevented from being loosed due to a diameter change of the film members 13, 14 wound around the film winding shafts 17, 18. Therefore, troubles due to this looseness such as inferior sealing of the film members 13, 14 and abnormal noise thereof can be prevented.

Specifically, when the number of windings of the film member 13 changes, a diameter of the film member 13 wound around the film winding shaft 17 is changed. Therefore, even if the moving member 21 moves by the same distance, that is, even if the film winding shaft 17 moves by the same distance, a length of the film member 13 wound around or wound off from the film winding shaft 17 is changed due to the diameter change of the film member 13. Generally, the wound length and the unwound length of the film member 13 per rotational angle of the film winding shaft 17 are set at a suitable length so that excessive tensile force is not applied to the film member 13 when the wound diameter of the film member 13 is the smallest. Thus, when the wound diameter of the film member 13 increases, the wound length or the unwound length of the film member 13 per rotational angle of the film winding shaft 17 is increased than the suitable length, and the film member 13 may be loosed. Similarly, when the wound diameter of the film member 14 increases, the wound length or the unwound length of the film member 14 per rotational angle of the film winding shaft 18 is increased than the suitable length, and the film member 14 may be loosed.

In the first embodiment, a pitch of the linear gear 19 of the opening forming member 16 is changed in accordance with the diameter change of the film member 13 wound around the film winding shaft 17. Further, a pitch of the linear gear 20 of the opening forming member 16 is also changed in accordance with the diameter change of the film member 14 wound around the film winding shaft 18. Because the fixing portions 16*d* are located at an upper end side of the linear gear 19, the wound diameter of the cool-air film member 13 is maximum at the upper end side of the linear gear 19, and is minimum at a lower end side thereof. Therefore, the pitch of the linear gear 19 is gradually changed so as to be maximum at the upper end side and minimum at the lower end side. Further, because the fixing portions 16*e* are located at a lower end side of the linear gear 20, the wound diameter of the warm-air film member 14 is maximum at the lower end side of the linear gear 20, and is minimum at a upper end side thereof. Therefore, the pitch of the linear gear 20 is gradually changed so as to be maximum at the lower end side and minimum at the upper end side.

Thus, when the cool-air film winding shaft 17 is positioned at the upper end side of the linear gear 19, the wound diameter of the cool-air film member 13 is increased. At the upper end side, the pitch of the linear gear 19 increases, and the rotational angle of the circular gear 17*a* of the cool-air film winding shaft 17 is reduced. On the contrary, when the cool-air film winding shaft 17 is positioned at the lower end side of the linear gear 19, the wound diameter of the cool-air film member 13 is reduced. At the lower end side, the pitch of the linear gear 19 reduces, and the rotational angle of the circular gear 17*a* of the cool-air film winding shaft 17 is increased. Similarly, when the wound diameter of the warm-air film member 14 increases, the pitch of the linear gear 20 is increased, and the rotational angle of the circular gear 17*a* of the cool-air film winding shaft 17 is reduced. On the contrary, when the wound diameter of the warm-air film member 14 reduces, the pitch of the linear gear 20 is reduced, and the rotational angle of the circular gear 17*a* of the cool-air film winding shaft 17 is increased.

As in this manner, the rotational angle of the cool-air film winding shaft 17 is changed in accordance with the wound diameter change of the cool-air film member 13, thereby adjusting a phase difference between the moving distance of the moving member 21 and the rotational angle of the cool-air film winding shaft 17. Therefore, regardless of the wound diameter change of the cool-air film member 13, the wound length and the unwound length of the cool-air film member 13 can be stabilized with respect to the moving distance of the moving member 21 (cool-air film winding shaft 17). Similarly, regardless of the wound diameter change of the warm-air film member 14, the wound length and the wound off length of the warm-air film member 14 can be stabilized with respect to the moving distance of the moving member 21. Accordingly, the film members 13, 14 can be prevented from being loosed, thereby preventing the troubles such as inferior sealing of the film members 13, 14 and tramp abnormal noise.

Further, the fixing portions 16*d*, 16*e* are disposed at upper and lower ends of the opening forming member 16, respectively. The air passages 11, 12 are arranged at upper and lower sides, respectively, adjacent to the partitioning portion 16*a*. Therefore, the cool air in the cool air passage 11 and the warm air in the warm air passage 12 flow adjacent to each other, thereby improving mixing performance between the cool air and the warm air at the downstream side, and reducing a temperature variation of air to be blown into the passenger compartment.

In the first embodiment, the movement of the cool-air film winding shaft 17 and the movement of the warm-air film winding shaft 18 are operatively linked with each other by the moving member 21. However, different drive mechanisms, for example, the drive shaft 22 and another actuator, may be provided for the cool-air film winding shaft 17 and the warm-air film winding shaft 18, respectively. In this case, the winding operation and the winding off operation of the cool-air film winding shaft 17 and those of the warm-air film winding shaft 18 are controlled independently from each other. According to this modification of the first embodiment, in the intermediate temperature controlling operation shown in FIG. 2, the air blowing temperature can be adjusted in the intermediate temperature region while the opening of the air passage 11 or the opening of the air passage 12 is entirely opened. In this case, air flowing resistance (pressure loss) in the intermediate temperature control operation can be reduced.

Further, operation mechanisms different from the above-described mechanism may be provided for the blow-mode film members. In this case, the air passage opening/closing device in the first embodiment can be used for each of the blow-mode film members for opening and closing the blow openings 5–9.

At the fixing portions 16*d* where the wound diameter of the film member 13 increases, a rotational center axis of the film winding shaft 17 is dislocated to a position separated from the linear gear 19. Therefore, the thickness of the linear gear 19 shown in FIG. 5 may be larger at the fixing portions 16*d* than at an opposite side of the fixing portions 16*d*, thereby compensating the dislocating of the rotational center axis of the film winding shaft 17. Similarly, the thickness of the linear gear 20 shown in FIG. 5 may be larger at the fixing portions 16*e* than at an opposite side of the fixing portions 16*e*, thereby compensating the dislocating of the rotational center axis of the film winding shaft 18. In this case, the thickness of the linear gear 19, 20 is set to be gradually changed.

The drive shaft 22 may be connected not to the actuator but to a manual operation mechanism, and the winding operation and the unwinding operation of the film winding shafts 17, 18 may be manually performed. In the first embodiment, the fixing portions 16*d* are located above the cool air passage 11. However, the fixing portions 16*d* may be located below the cool air passage 11, and the fixing portions 16*e* may be located above the warm air passage 12. Further, the positions of the fixing portions 16*d*, 16*e* can be suitably changed in accordance with the positions of the operation mechanism such as the gears 19, 20.

(Second Embodiment)

In the first embodiment, the pitches of the linear gears 19, 20 are changed in accordance with the changes of the wound diameters of the film members 13, 14, respectively, so that the changes of the winding length and the unwinding length of the film winding shafts 17, 18 are absorbed to prevent the film members 13, 14 from being loosed. However, in the second embodiment, the circular gears 17*a*, 18*a* are separated from the film winding shafts 17, 18, and a spring member is disposed between the separated circular gear 17*a* and the film winding shaft 17. Further, another spring member is disposed between the separated circular gear 18*a* and the film wind shaft 18. The rotational phase difference is set between the separated circular gear 17*a* and the film wind shaft 17, and between the separated circular gear 18*a* and the film wind shaft 18, thereby compensating the changes of the winding length and the winding off length of the film winding shafts 17, 18 due to the wound diameter changes of the film members 13, 14.

Figure 6:
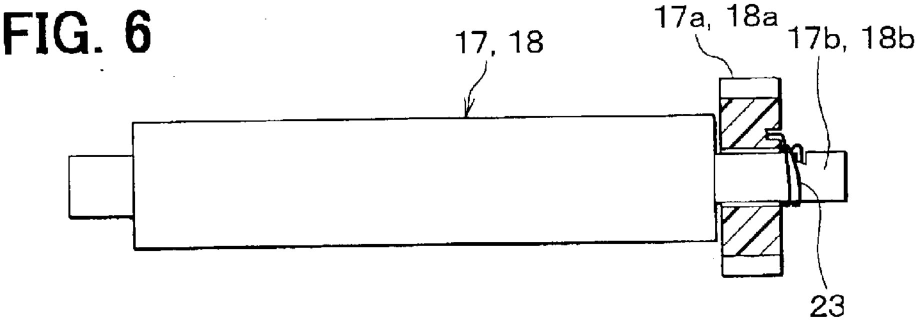
FIG. 6 is a partially-sectional front view showing a film winding shaft of an air passage opening/closing device according to a second embodiment of the present invention.

Specifically, as shown in FIG. 6, the separated circular gears 17*a*, 18*a* are rotatably fitted to small diameter portions 17*b*, 18*b* of the film winding shafts 17, 18, respectively. One end of a coil spring 23 as the spring member is fixed to an outer peripheral portion of the small diameter portion 17*b*, and the other end thereof is fixed to the separated circular gear 17*a*. When the film winding shaft 17 is positioned at the fixing portions 16*d*, the wound diameter of the film member 13 is maximum, and the coil spring 23 is wound in maximum. As the wound diameter of the film member 13 reduces, the coil spring is wound off.

Accordingly, the rotational phase difference between the film winding shaft 17 and the separated circular gear 17*a* is set by the spring force of the coil spring 23, in a rotational angle region of the film winding shaft 17. In the rotational angle region, the wound diameter of the film member 17 is in a diameter region between the maximum diameter and a diameter reduced from the maximum diameter by a predetermined dimension. For example, the rotational angle of the film winding shaft 17 is in a rotational angle region of 90 degrees at the maximum wound diameter. In the second embodiment, the rotational phase difference is set so that the rotational angle of the film winding shaft 17 is reduced relative to the rotational angle of the separated circular gear 17*a* at the maximum wound side, thereby suitably maintaining the wound length and the wound off length of the film member 13 even at the maximum wound diameter. At the same time, tensile force of the coil spring 23 can be applied to the film member 13 at the maximum wound side, thereby preventing the film member 13 at the maximum wound side from being loosed. The film winding shaft 18 has a structure similar to that of the film winding shaft 17. In the second embodiment, the other parts are similar to those of the above described first embodiment.

(Third Embodiment)

In the above-described second embodiment, because the coil spring 23 has a relatively short length, the winding off operation of the coil spring 23 is ended at a position between the maximum wound diameter of the film member 13 and the minimum wound diameter thereof, and at a position between the maximum wound diameter of the film member 14 and the minimum wound diameter thereof. After the winding off operation of the coil spring 23 is ended, the tensile force of the coil spring 23 disappears.

Figure 7:
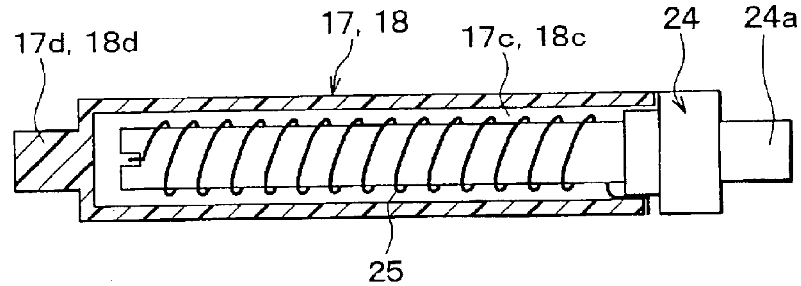
FIG. 7 is a partially-sectional front view showing a film winding shaft of an air passage opening/closing device according to a third embodiment of the present invention.

However, in the third embodiment, as shown in FIG. 7, the film winding shaft 17 is formed in a cylindrical shape, and a spring support shaft 24 separated from the film winding shaft 17 is rotatably fitted in a cylindrical inner spaces 17*c* of the film winding shaft 17. An end portion 24*a* of the spring support shaft 24 protrudes outside the film winding shaft 17, and is fitted into the circular shaft holder 21*c* of the moving member 21 at the right side. An end portion 17*d* of the film winding shaft 17 at an opposite side of the end portion 24*a* is fitted into the circular shaft holder 21*e* of the moving member 21 at the left side. A coil spring 25 has a length approximately equal to an entire axial length of the inner space 17*c*, and is attached to an outer peripheral surface of the spring support shaft 24. One end of the coil spring 25 is fixed to an insert top end of the spring support shaft 24, and the other end thereof is fixed to a cylindrical end of the film winding shaft 17, opposite to the insert top end of the spring support shaft 24.

In the third embodiment, the coil spring 25 is set so that its tensile force can be applied to the film member 13 in an entire moving region of the film winding shaft 17 and the spring support shaft 24 between the maximum wound diameter of the film member 13 and the minimum wound diameter thereof. When the film winding shaft 17 and the spring support shaft 24 move from the maximum wound diameter of the film member 13 to the minimum wound diameter thereof, the film winding shaft 17 is rotated with the winding off of the film member 13. The coil spring 25 is wound in accordance with this rotation of the film winding shaft 17. When the wound length of the film member 13 is minimum, the coil spring 25 is wound in maximum, and spring force is stored in the coil spring 25.

On the contrary, when the film winding shaft 17 and the spring support shaft 24 move from the minimum wound diameter of the film member 13 to the maximum wound diameter thereof, the film winding shaft 17 is rotated by the stored spring force of the coil spring 25. Therefore, the film member 13 can be wound around the film winding shaft 17. Thus, in the third embodiment, the circular gear 17*a* and the linear gear 19 in the first and second embodiments can be eliminated. Further, the film winding shaft 17 is connected through the coil spring 25 to the spring support shaft 24 that moves integrally with the moving member 21. Therefore, the rotational phase difference can be set between the spring support shaft 24 and the film winding shaft 17. Accordingly, the film member 13 can be prevented from being loosed due to the wound diameter change of the film member 13. In the third embodiment, the film winding shaft 18 has a structure similar to that of the film winding shaft 17. In the third embodiment, the other parts are similar to those of the above-described first embodiment.

(Fourth Embodiment)

In the above-described first to third embodiments, the moving member 21 is a rigid component, and the moving member 21 must move for the winding operation and the winding off operation of the film winding shafts 17, 18. Therefore, a space for the movement of the moving member 21 is required. Especially, if one air passage such as any one of blow openings 5–9 is opened and closed by one film member 13, the required space is larger, thereby further increasing the size of the air conditioning case 1*a*.

Figure 8A:
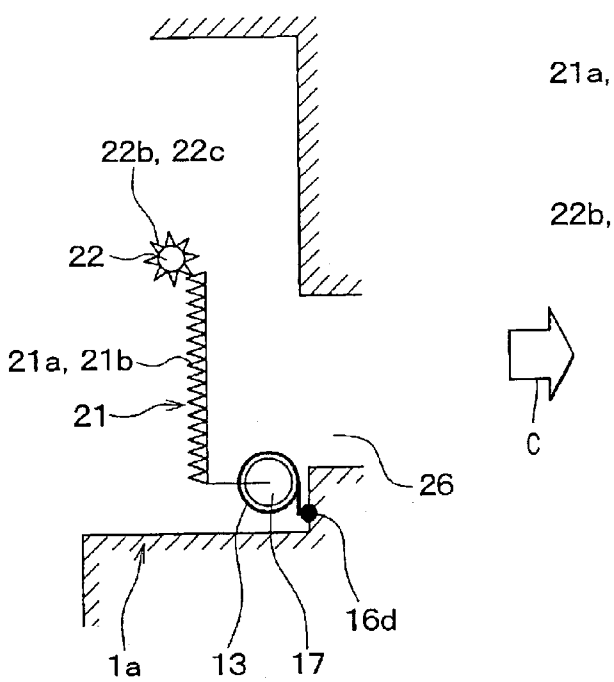
FIG. 8A is a schematic sectional diagram showing a problem to be solved in a fourth embodiment of the present invention when an air passage is opened.
Figure 8B:
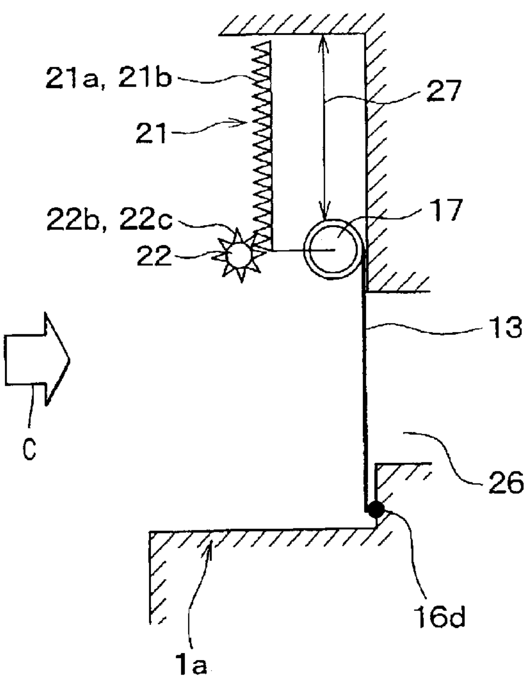
FIG. 8B is a schematic sectional diagram showing a problem to be solved in the fourth embodiment when an air passage is closed.

FIG. 8A shows a state where the moving member 21 and the film winding shaft 17 move to the fixing portions 16*d* and all of the film member 13 is wound around the film winding shaft 17. In this case, an opening of an air passage 26, corresponding to the front face opening 6 in FIG. 1, is entirely opened. On the other hand, FIG. 8B shows a state where the moving member 21 and the film winding shaft 17 move to an opposite side of the fixing portions 16*d* in maximum, and all of the film member 13 is unwound from the film winding shaft 17. In this case, the opening of an air passage 26, corresponding to the front face opening 6 in FIG. 3, is entirely closed by the film member 13. Thus, the space for the movement of the moving member 21 is required at an upstream side of the air passage 26 and at the lateral side of the air passage 26.

Figure 9A:
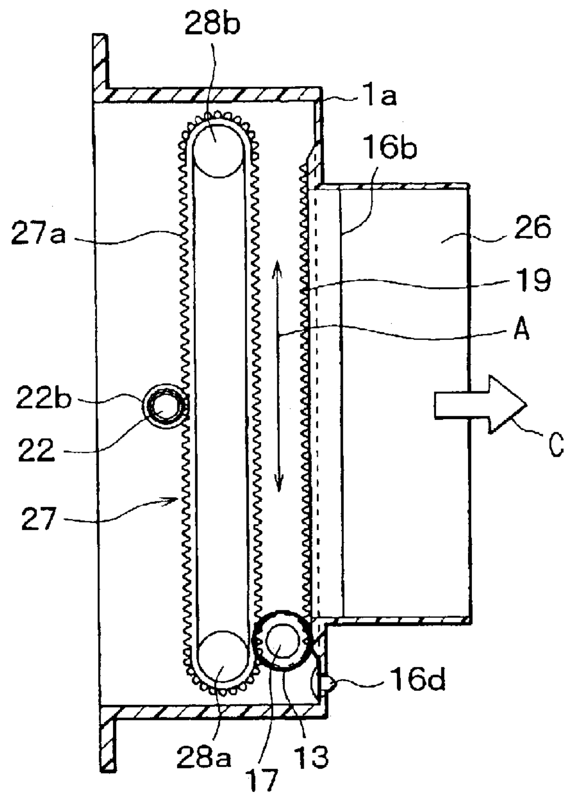
FIG. 9A is a cross-sectional view showing a main part of an air passage opening/closing device, taken along a section perpendicular to a film winding shaft, according to a fourth embodiment of the present invention.
Figure 9B:
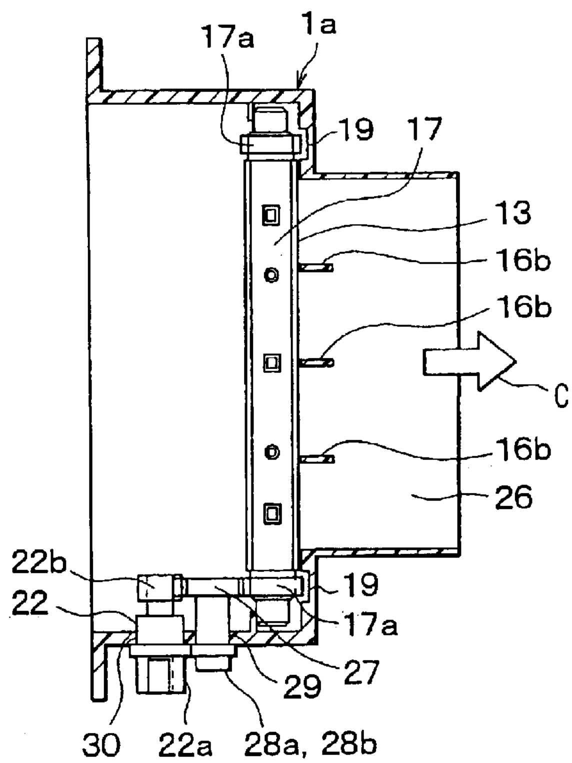
FIG. 9B is a cross-sectional view showing the main part of the air passage opening/closing device, taken along a section parallel to the film winding shaft, according to the fourth embodiment.
Figure 10:
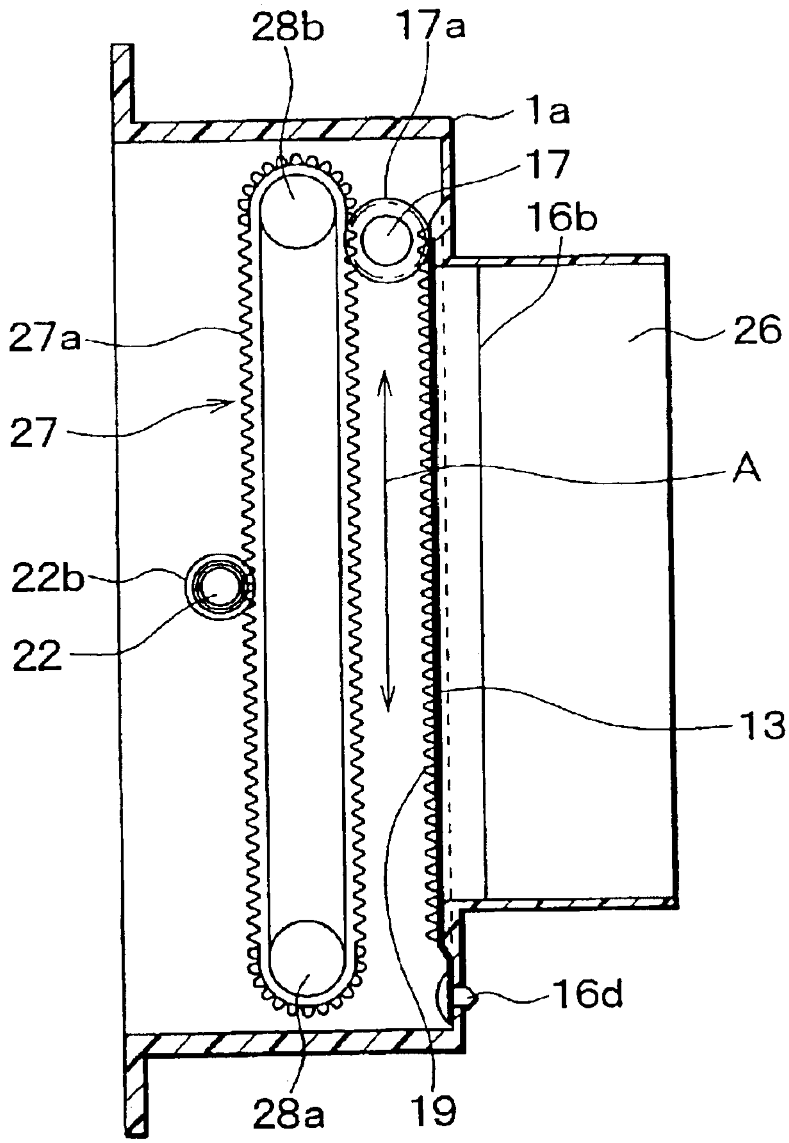
FIG. 10 is a cross-sectional view showing the main part of the air passage opening/closing device in an entirely closed state of an air passage, taken along the section perpendicular to the axial direction of the film winding shaft, according to the fourth embodiment.

In the fourth embodiment shown in FIGS. 9A, 9B, 10, the above trouble is solved. In FIGS. 9A, 9B, 10, the same portions as in the above-described embodiments are indicated by the same reference numerals. In FIGS. 9A, 9B, 10, the air passage 26 is provided in the air conditioning case 1*a*, and plural grids 16*b* are formed at an upstream opening end in the air passage 26. For example, the air passage 26 corresponds to any one of the blow openings 5–9 in the above-described embodiments. The fixing portions 16*d*, for fixing one end of the film member 13 to the air conditioning case 1*a*, are provided on an outer periphery portion of an upstream opening in the air passage 26. The other end of the film member 13 is connected to the film winding shaft 17, and the film member 13 is wound around and wound off from the film winding shaft 17, as in the first embodiment. However, in the fourth embodiment, as shown in FIG. 9B, two circular gears 17*a* are integrated to the film winding shaft 17 at two axial ends, respectively. Two linear gears 19 are provided on the outer periphery portion of the upstream opening of the air passage 26. The two circular gears 17*a* engage with the two linear gears 19, respectively.

In the fourth embodiment, a gear belt 27 is used as an operation mechanism for moving the film winding shaft 17 to and from the fixing portions 16*d*. The gear belt 27 is flexible, and is formed in a loop shape by an elastic material, for example, a rubber material reinforced with fibers. A gear 27*a* is integrally formed on an entire outer periphery of the gear belt 27. As shown in FIG. 9B, the gear belt 27 is disposed upstream of the circular gear 17*a* at one axial end of the film winding shaft 17, and the gear 27*a* engages with the circular gear 17*a*. As shown in FIG. 9A, the gear belt 27 with the gear 27*a* is disposed to form an elliptical loop extending along an entire movement range of the film winding shaft 17 in its movement direction A.

Cylindrical guide shafts 28*a*, 28*b* protrude from a wall surface of the air conditioning case 1*a* toward inside of the air conditioning case 1*a* around both ends in movement direction A. Further, the guide shafts 28*a*, 28*b* are disposed inside the gear belt 27 around both ends in its longitudinal direction so as to maintain the gear belt 27 in the elliptical loop shape. The guide shafts 28*a*, 28*b* are rotatably supported by bearing holes 29 provided in a wall surface of the air conditioning case 1*a*. Here, if sliding friction between the gear belt 27 and the guide shafts 28*a*, 28*b* can be reduced, the guide shafts 28*a*, 28*b* can be fixed to the wall surface of the air conditioning case 1*a*. In this case, the guide shafts 28*a*, 28*b* can be integrated to the wall surface of the air conditioning case 1*a* by resin molding.

The drive shaft 22 is disposed upstream of the gear belt 27 in the air conditioning case 1*a*. The drive shaft 22 is rotatably supported by a bearing hole 30 provided in the wall surface of the air conditioning case 1*a*, and protrudes inside the air conditioning case 1*a*. The circular gear 22*b* is integrated to a top end of the drive shaft 22 protruding inside the air conditioning case 1*a*, and engages with the gear 27*a* of the gear belt 27. A protrusion 22*a* of the drive shaft 22 protrudes outside the air conditioning case 1*a*, and is connected to an actuator such as a step motor or a manual operation mechanism as in the first embodiment.

Next, operation in the fourth embodiment will be described. FIG. 9A shows a fully opened state of the air passage 26. In the fully opened state of the air passage 26 shown in FIG. 9A, because the film winding shaft 17 is moved to a position proximate to the fixing portions 16*d*, all the film member 13 is wound around the film winding shaft 17, and the air passage 26 is entirely opened. Therefore, air flows in a direction C in the air passage 26. In this entirely opened state of the air passage 26, when the drive shaft 22 rotates clockwise in FIG. 9A, the gear belt 27 is rotated counterclockwise due to the engagement between the gear 27*a* and the circular gear 22*b*. Therefore, the film winding shaft 17 moves upward while rotating clockwise due to the engagement between the gear 27*a* and the circular gear 17*a*, and the engagement between the circular gears 17*a* and the linear gears 19. Thus, the film member 13 at the other end side is wound off from the film winding shaft 17. FIG. 10 shows a fully closed state of the air passage 26.

In FIG. 10, the upward movement of the film winding shaft 17 is ended, and the film winding shaft 17 is positioned at an opposite side of the fixing portions 16*d* on the outer periphery portion of the upstream opening in the air passage 26. Therefore, the air passage 26 is entirely closed by the film member 13. Then, when the film winding shaft 17 is moved downward from the state in FIG. 10, the film member 13 is wound around the film winding shaft 17, and the air passage 26 is opened.

In the fourth embodiment, the film winding shaft 17 can be moved in the direction A by the rotating of the flexible gear belt 27 having the loop shape. Therefore, a space for the movement of the moving member 21, shown in FIG. 8B, is not required at the lateral side of the air passage 26. As shown in FIGS. 9A, 9B, the gear belt 27 can be disposed in a very small space located upstream of the circular gear 17*a* of the film winding shaft 17 at its one axial end, thereby effectively reducing the size of the air conditioning case 1*a*.

Further, when the film member 13 of the fourth embodiment is used for the air mixing control, temperature control characteristics can be improved as compared with the first embodiment. Specifically, in the above-described first embodiment, the movement of the cool-air film winding shaft 17 is operatively linked with the movement of the warm-air film winding shaft 18 by the moving member 21, so that the opening (refer to FIG. 5) provided between the film winding shafts 17, 18 is moved. Thus, the opening area of the cool air passage 11 and the opening area of the warm air passage 12 are changed, and the flow amount ratio between the cool air and the warm air is changed.

Generally, because the heater core 4 is disposed in the warm air passage 12, pressure loss in the warm air passage 12 is generally higher than the pressure loss in the cool air passage 11. However, because the opening between the film winding shafts 17, 18 is always moved while its area is constant, the opening area of the cool air passage 11 and the opening area of the warm air passage 12 are increased and decreased by the same change rate. Therefore, the pressure loss in the cool air passage 11 and the pressure loss in the warm air passage 12 are different from each other, and the flow change rate of the cool air and the flow change rate of the warm air are different from each other with respect to the movement of the moving member 21. Thus, the temperature control characteristics of blown air is reduced.

In the fourth embodiment, the cool-air operation mechanism shown in FIGS. 9A, 9B, 10 can be provided for the cool-air film winding shaft 17 in the cool air passage 11, and the warm-air operation mechanism shown in FIGS. 9A, 9B, 10 can be provided for the warm-air film winding shaft 18 in the warm air passage 12 respectively, independently. Thus, the movement amount of the cool-air film winding shaft 17 can be set to correspond to the pressure loss in the cool air passage 11, and the movement amount of the warm-air film winding shaft 18 can be set to correspond to the pressure loss in the warm air passage 12 in independent from the movement amount of the cool-air film winding shaft 17.

Because the pressure loss in the cool air passage 11 and the pressure loss in the warm air passage 12 are different from each other, the flow change rate of the cool air and the flow change rate of the warm air are different from each other with respect to the movement of the moving member 21. However, in the fourth embodiment, the opening area of the cool air passage 11 and the opening area of the warm air passage 12 can be independently controlled in consideration of this pressure loss difference. Accordingly, the cool air amount and the warm air amount can be changed by the same change rate, thereby improving the control characteristics of air blowing temperature. Further, the compensation method of the wound diameter change of the film member 13 may be set similarly to that in the first to third embodiments.

The fourth embodiment can be modified in the following manner. A normal belt 27 without the gear 27*a* may be used in place of the gear belt 27 having the gear 27*a*. Even in this case, the above operational effects in the fourth embodiment can be exhibited. In this case, the drive shaft 22 may have a simple shaft shape where the circular gear 22*b* is not provided. Further, a simple shaft portion of the drive shaft 22 press-contacts the normal belt 27, and transmits rotational motive power from the drive shaft 22 to the normal belt 27 by using friction of a rubber material of the normal belt 27, thereby rotating the normal belt 27.

Further, the film winding shaft 17 without the circular gear 17*a* and the air conditioning case 1*a* without the linear gear 19 may be used. In this case, in place of the circular gear 17*a* and the liner gear 19, a high-friction roller portion made of rubber is provided on an outer peripheral surface of the simple shaft portion of the film winding shaft 17. The high-friction roller portion of the film winding shaft 17 press-contacts the normal belt 27 and a plane sliding surface on the outer peripheral portion of the upstream opening of the air passage 26. Thus, when the normal belt 27 rotates, the film winding shaft 17 is moved in the arrow direction A shown in FIGS. 9A, 10 while being rotated, due to the frictional rotation transmittance. Therefore, in this case, the same operational effects as in the fourth embodiment can be obtained.

In this case, the air conditioning case 1*a* may have the liner gear 19, and the film winding shaft 17 may have a circular gear 17*a* to engage with only the linear gear 19. In this modification, because there is no slip between the film winding shaft 17 and the air conditioning case 1*a*, the high-friction roller portion is not required to be provided on the film winding shaft 17. That is, the normal belt 27 press-contacts the simple shaft portion of the film winding shaft 17, thereby transmitting the rotation of the normal belt 27 to the film winding shaft 17 by using the friction therebetween. In the modifications, since the rotational transmittance from the drive shaft 22 to the normal belt 27 is performed by using the friction therebetween, belt tension of the normal belt 27 is increased than that in the fourth embodiment.

Further, in place of the normal belt 27, a loop chain made of metal or resin may be used. In this case, penetration cavities or recess engagement portions of the loop chain are engaged with the circular gear 22*b* of the drive shaft 22 and the circular gear 17*a* of the film winding shaft 17, thereby obtaining the same operational effects as in the fourth embodiment. That is, a various member such as the normal belt 27 and the chain can be used as a rotation transmittance member for moving the film winding shaft 17.

(Fifth Embodiment)

Figure 11:
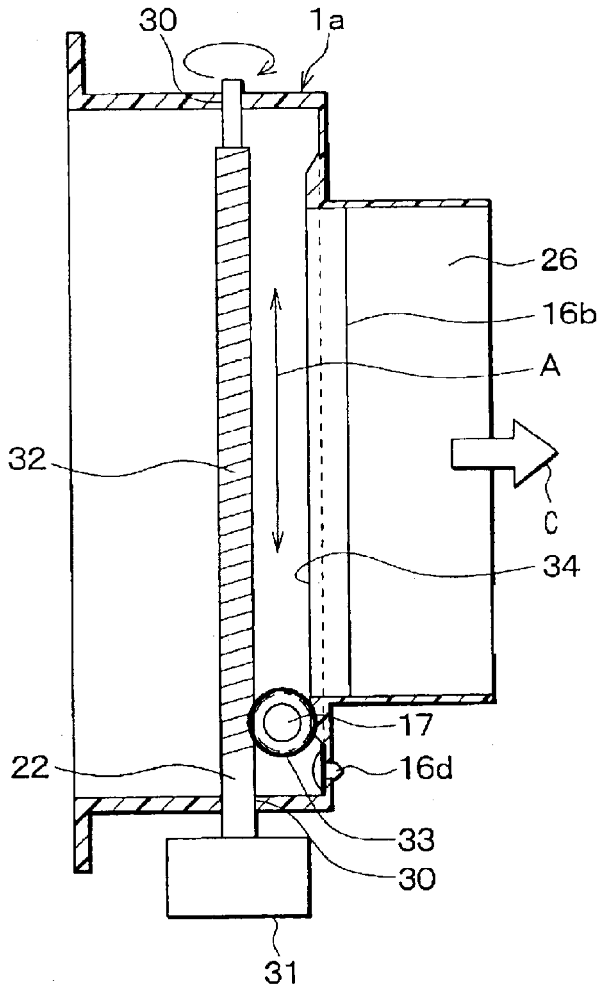
FIG. 11 is a cross-sectional view showing a main part of an air passage opening/closing device in an entirely opened state of an air passage, taken along a section perpendicular to the axial direction of the film winding shaft, according to a fifth embodiment of the present invention.

In the fifth embodiment, a film member operation mechanism different from that in the fourth embodiment is used, while the same operational effects as in the fourth embodiment can be obtained. In the fifth embodiment, as shown in FIG. 11, an actuator 31 such as a step motor is disposed outside the air conditioning case 1*a*. FIG. 11 corresponds to the state of FIG. 9A. The drive shaft 22, driven by the actuator 31, is rotatably supported by the bearing hole 30 provided in the wall of the air conditioning case 1*a*. The drive shaft 22 includes a worm portion 32 as a worm gear mechanism, inside the air conditioning case 1*a*. Specifically, the worm portion 32 is formed on an outer peripheral surface of the drive shaft 22 in a screw shape, and extends in an entire movement region of the film winding shaft 17 in the arrow direction A.

On the other hand, a worm wheel 33 is provided at one end of the film winding shaft 17, for example, at its position corresponding to the circular gear 17*a* shown in FIG. 9B, and is engaged with the worm portion 32. Further, the air conditioning case 1*a* includes a guide portion 34 for guiding two ends of the worm wheel 33 in an axial direction of the worm wheel 33, so that the engagement between the worm wheel 33 and the worm portion 32 is accurately maintained. The drive shaft 22 and the film winding shaft 17 are disposed, to cross at right angles, adjacent to the outer peripheral portion of the upstream opening in the air passage 26. Also in the fifth embodiment, the fixing portions 16*d*, for fixing one end of the film member 13 to the air conditioning case 1*a*, are provided on the outer periphery portion of the upstream opening in the air passage 26, and the other end of the film member 13 is connected to the film winding shaft 17.

When the drive shaft 22 rotates, the film winding shaft 17 is moved in the arrow direction A shown in FIG. 11 while being rotated through the engagement portion between the worm portion 32 and the worm wheel 33. The film member 13 at the other end side is wound around and wound off from the film winding shaft 17 by moving the film winding shaft 17, thereby opening and closing the opening of the air passage 26. Thus, the worm gear mechanism constructed with the worm portion 32 of the drive shaft 22 and the worm wheel 33 of the film winding shaft 17 can be compactly disposed inside the air conditioning case 1*a*, and the moving member 21 described in the first embodiment can be eliminated, thereby reducing the size of the air conditioning case 1*a*.

(Sixth Embodiment)

Figure 12:
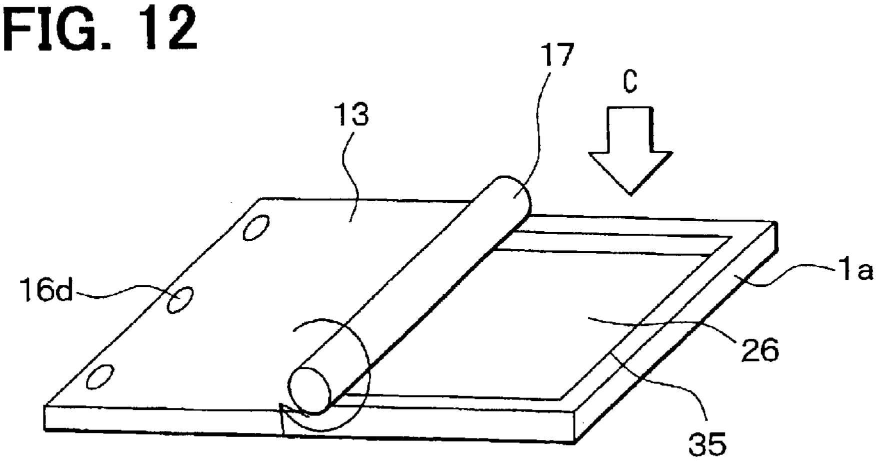
FIG. 12 is a schematic sectional view showing a reference example for explaining a problem to be solved in the sixth embodiment.
Figure 13:
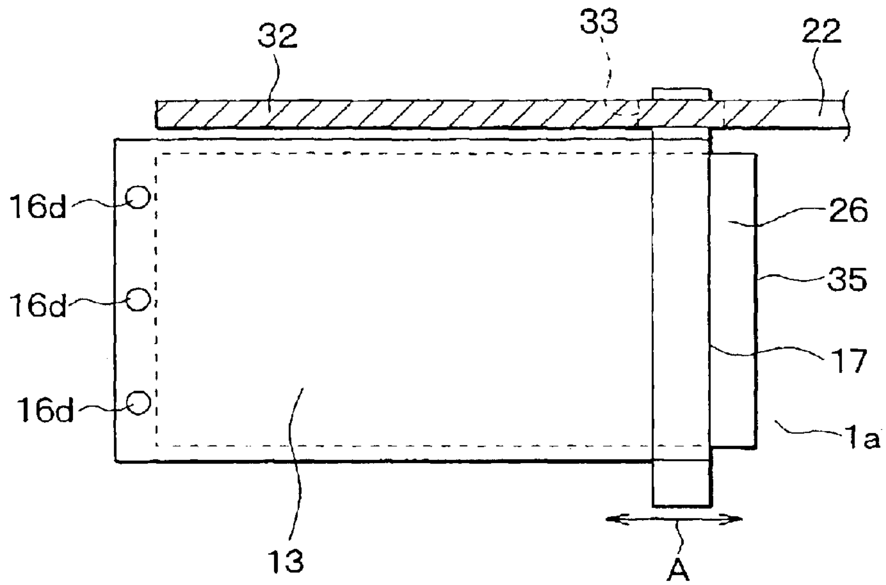
FIG. 13 is a schematic plan diagram showing the reference example shown in FIG. 12.

FIGS. 12, 13 show a reference example of the sixth embodiment, in which the upstream opening in the air passage 26 has a rectangular shape. In this case, a side wall 35 for defining the upstream opening in the air passage 26, positioned at an opposite side of the fixing portions 16*d* for fixing one end of the film member 13 to the air conditioning case 1*a*, is formed into a right line parallel to the other end of the film member 13 and the film winding shaft 17. When the other end of the film member 13 approaches the side end 35 of the upstream opening in the air passage 26, that is, when the film winding shaft 17 moves toward the entire closed state of the air passage 26, static pressure upstream of the film member 13 (at an upper side in FIG. 12) in the air passage 6 is increased in accordance with a reduce of the opening area of the upstream opening in the air passage 26.

Furthermore, because the side end 35 extends in the right line parallel to the film winding shaft 17, the upstream opening is defined along an entire width of the film member 13 until the upstream opening of the air passage 26 is entirely closed. Thus, an amount of air flowing in the air passage 26 is maintained larger until the upstream opening of the air passage 26 is entirely closed. As a result, the amount of air flowing in the air passage 26 is rapidly reduced immediately before the upstream opening of the air passage 26 is entirely closed. This rapid reduction of the air amount is shown by a broken line in FIG. 14.

Figure 14:
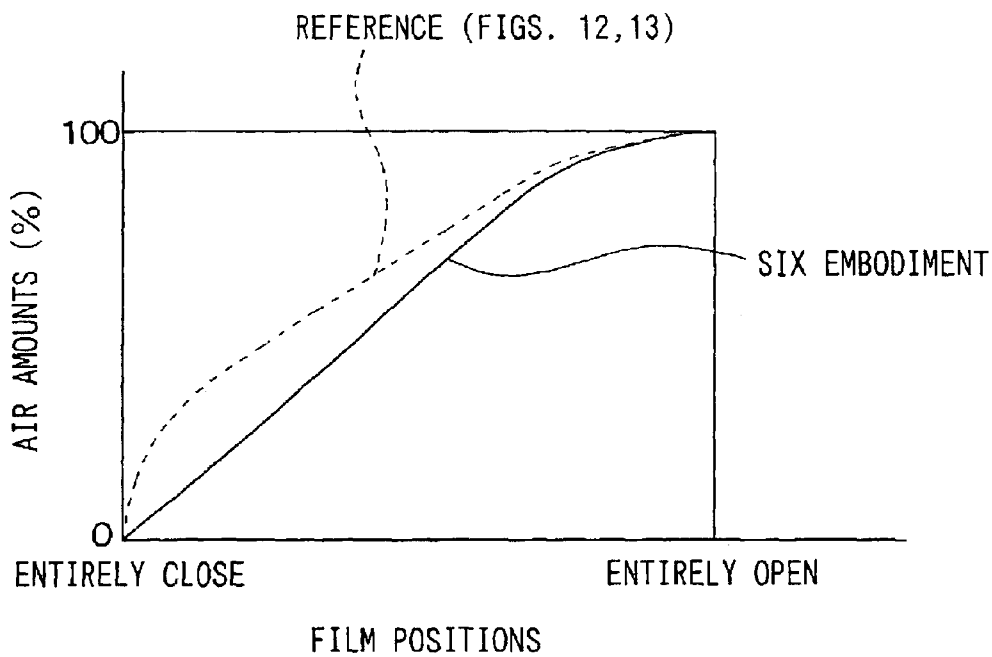
FIG. 14 is a characteristic graph showing an amount of air flowing in an air passage of the reference example and that of an air passage opening/closing device according to a sixth embodiment of the present invention.

FIG. 14 plots positions (film positions) of the other end of the film member 13 (film winding shaft 17) as the abscissa. At an entire closed position of the film member 13 in FIG. 14, the other end of the film member 13 is separated from the fixing portions 16*d* in maximum, so that the upstream opening in the air passage 26 is entirely closed. That is, at the entire closed position in FIG. 14, the air passage 26 is fully closed in FIGS. 12 and 13. At an entire opened position in FIG. 14, the other end of the film member 13 approaches the fixing portions 16*d* in maximum, so that the upstream opening in the air passage 26 is entirely opened in FIGS. 12, 13. FIG. 14 plots amounts (air amounts, %) of air flowing in the air passage 26 as the ordinate. When the other end of the film member 13 is moved to the above entire opened position, the air amount in the air passage 26 is defined at 100%. Specifically, FIG. 14 shows a ratio of present air amount to the air amount at the entire opened position.

Figure 15:
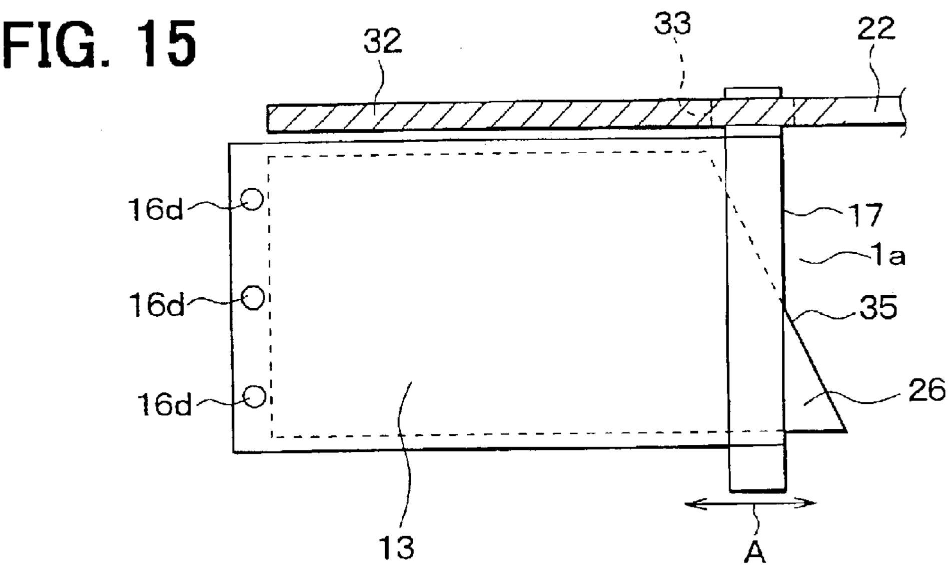
FIG. 15 is a schematic plan diagram showing the air passage opening/closing device according to the sixth embodiment.
Figure 16:
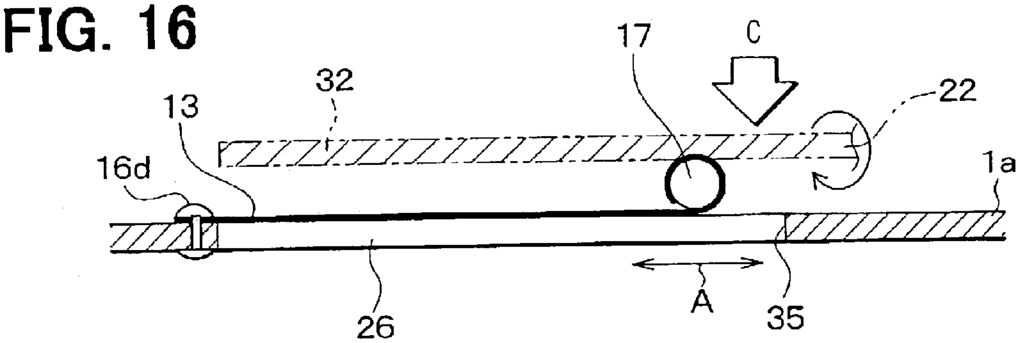
FIG. 16 is a schematic sectional diagram showing the air passage opening/closing device according to the sixth embodiment.

On the other hand, in the sixth embodiment shown in FIGS. 15, 16, the side end 35 at the side opposite to the fixing portions 16*d* is formed into a right line slantingly crossing with the other end of the film member 13 and the film winding shaft 17. In the sixth embodiment, a mechanism for moving the other end of the film member 13 together with the film winding shaft 17 in the arrow direction A is identical to that in the fifth embodiment shown in FIG. 11. Specifically, the worm portion 32 provided on the drive shaft 22 is engaged with the worm wheel 33 provided at one axial end of the film winding shaft 17, so that the film winding shaft 17 is moved by the rotation of the drive shaft 22 in the arrow direction A while being rotated. The air conditioning case 1*a* includes a guide portion (not shown) for guiding the two side surfaces of the worm wheel 33 of the film winding shaft 17 in the axial direction of the worm wheel 33. The guide portion is formed on the outer peripheral portion of the upstream opening in the air passage 26 along the side end portion at the upper side in FIG. 15, and is similar to the guide portion 34 shown in FIG. 11.

In the sixth embodiment, when the film winding shaft 17 and the other end of the film member 13 move to the entire closed side of the air passage 26, the upstream opening of the air passage 26 can be gradually closed along the slant side end 35 from the upper end to the lower end in FIG. 15. Therefore, in the sixth embodiment, the reduction rate of the opened area of the air passage 26 with respect to the movement amount of the film winding shaft 17 can be reduced than that in the above reference example shown in FIGS. 12, 13. Accordingly, even if the static pressure of the air passage 26 at the upstream side of the film member 13 is increased immediately before the air passage 26 is entirely closed, the reduction rate of the opening area of the air passage 26 is reduced. As a result, as indicated by the solid line shown in FIG. 14, the amount of air flowing in the air passage 26 can be linearly changed with respect to the position change of the film member 13.

Figure 17:
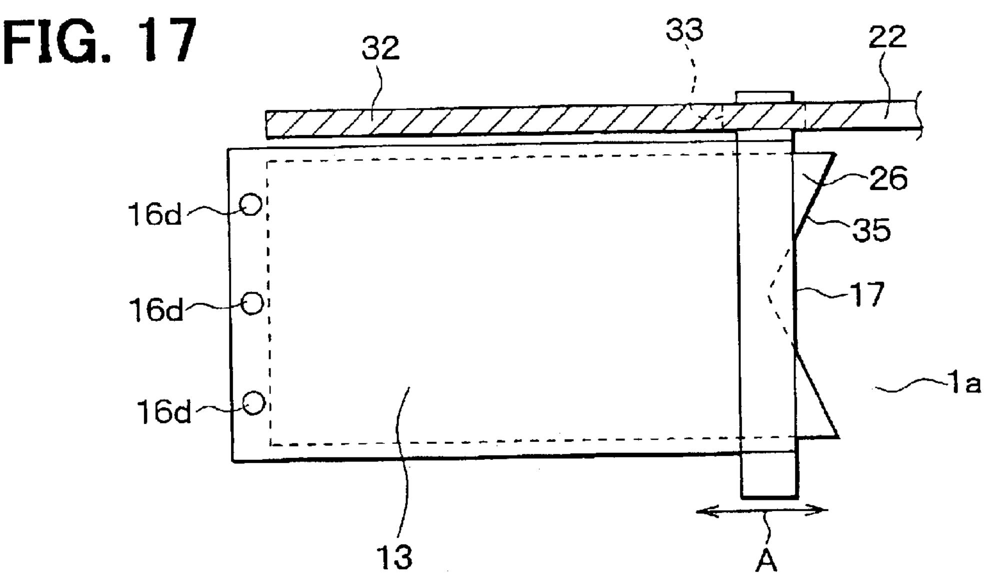
FIG. 17 is a schematic plan diagram showing an air passage opening/closing device according to a modification of the sixth embodiment.
Figure 18:
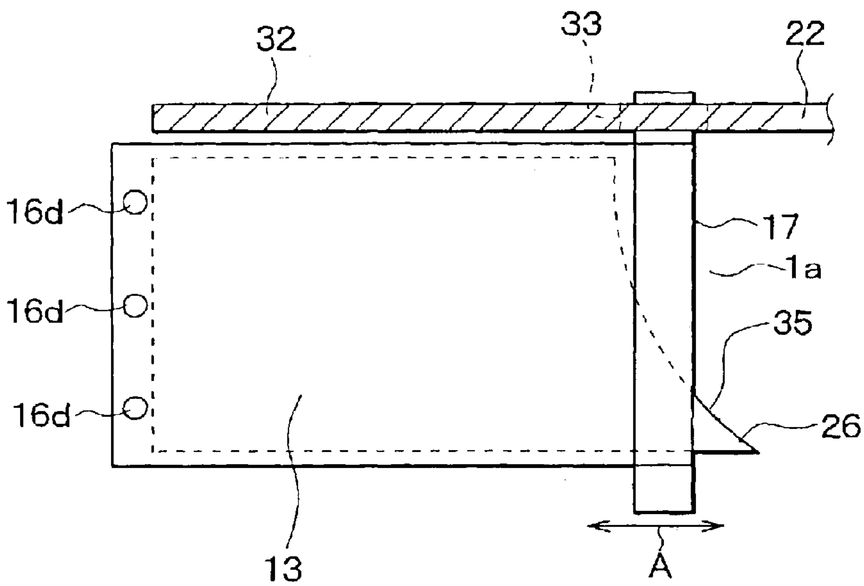
FIG. 18 is a schematic plan diagram showing an air passage opening/closing device according to another modification of the sixth embodiment.
Figure 19:
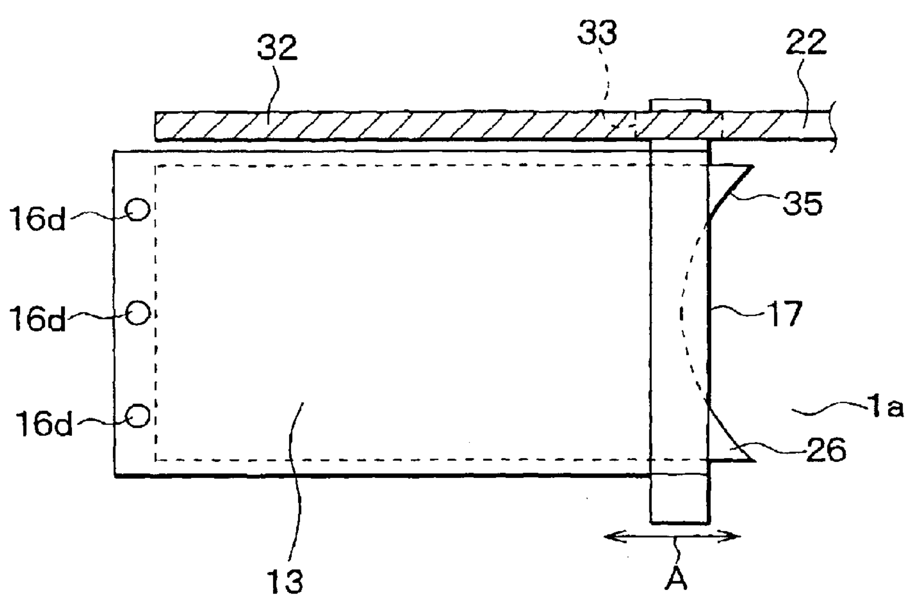
FIG. 19 is a schematic plan diagram showing an air passage opening/closing device according to another modification of the sixth embodiment.

FIGS. 17–19 show modifications of the sixth embodiment. In the modification of the sixth embodiment shown in FIG. 17, the side end 35 is provided slantwise in a saw tooth shape to be recessed at a center in an opening width direction. In another modification of the sixth embodiment shown in FIG. 18, the side end 35 is provided in a recessed curve shape. In another modification of the sixth embodiment shown in FIG. 19, the side end 35 is provided in a curve shape to be recessed at the center in the opening width direction. Even in the modifications shown in FIGS. 17–19, the same operational effects as in the sixth embodiment can be obtained.

(Seventh Embodiment)

The seventh embodiment of the present invention will be now described with reference to FIGS. 20 and 21.

In the above-described first to third embodiments, as shown in FIG. 8, the space 27 for moving the moving member 21 is required upstream of and at the lateral side of the air passage 26, thereby increasing the size of the air conditioning case 1*a*, on the other hand, in the above-described fourth to the sixth embodiments shown in FIGS. 9–16, the space 27, for moving the moving member 21, can be eliminated, thereby reducing the size of the air conditioning case 1*a*.

However, in the fourth to sixth embodiments, the size of the air conditioning case 1*a* is increased in the air flowing direction C. Specifically, in the fourth embodiment shown in FIGS. 9, 10, the film winding shaft 17, the guide shafts 28*a*, 28*b* and the drive shaft 22 are disposed to be stacked in the air flowing direction C. In the fifth and sixth embodiments shown in FIGS. 11–16, the film winding shaft 17 and the drive shaft 22 are disposed to be stacked in the air flowing direction C. Accordingly, the plural shafts are disposed to be stacked in the air flowing direction C, and the size of the air conditioning case 1*a* is increased in the air flowing direction C.

Figure 20:
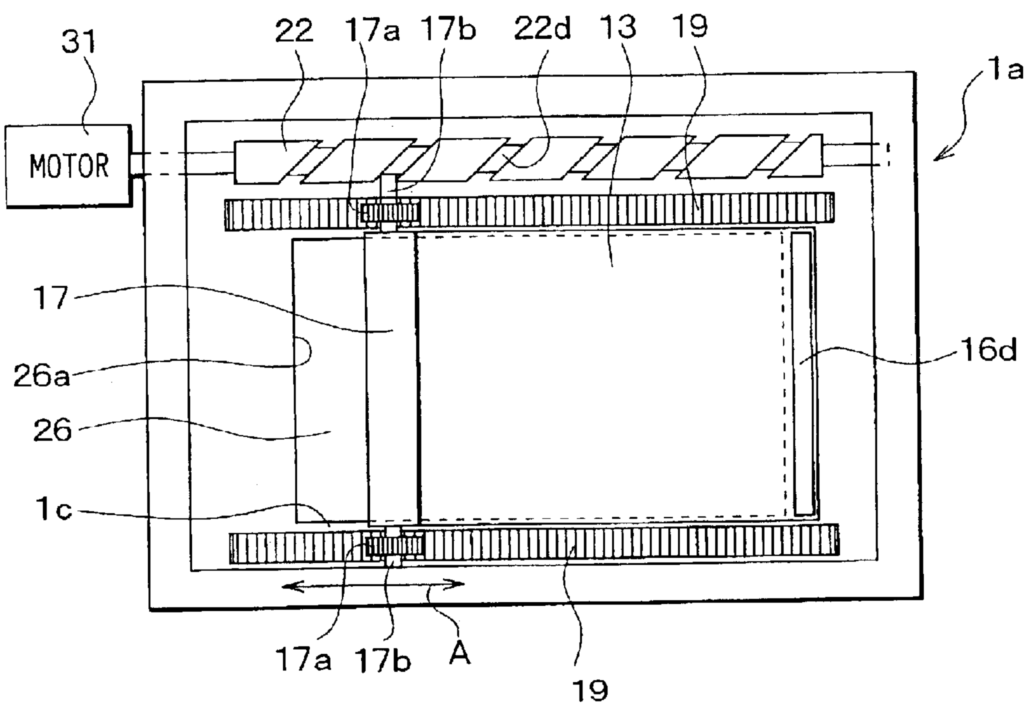
FIG. 20 is a schematic plan diagram showing an air passage opening/closing device according to a seventh embodiment of the present invention.
Figure 21:
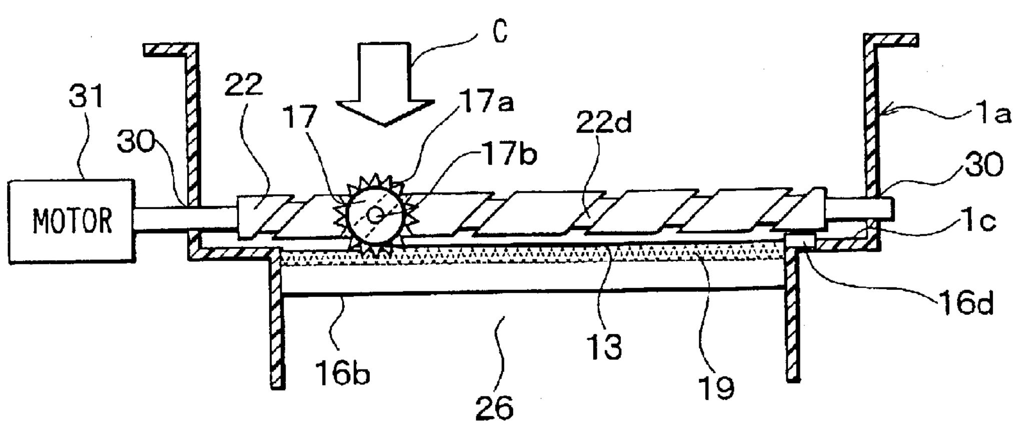
FIG. 21 is a schematic sectional diagram showing the air passage opening/closing device according to the seventh embodiment.

In the seventh embodiment shown in FIGS. 20, 21, the size of the air conditioning case 1*a* can be reduced also in the air flowing direction C. In FIGS. 20, 21, the same portions as in the above embodiments are indicated by the same reference numerals, respectively. The air conditioning case 1*a* has the rectangular upstream opening 26*a* of the air passage 26, and one end of the film member 13 is fixed to a longitudinal end of the outer peripheral portion defining the upstream opening 26*a* of the air passage 26. Specifically, a flat seal surface 1*c* is formed on the outer peripheral portion of the upstream opening 26*a*, one end of the film member 13 is fixed to the seal surface 1*c* by the fixing portion 16*d*. The other end of the film member 13 is connected to the film winding shaft 17, and the film member 13 at the other end side is wound around and wound off from the film winding shaft 17. The film winding shaft 17 is disposed to extend perpendicularly to the longitudinal direction of the upstream opening 26*a*. Small diameter portions (pin portions) 17*b* are formed at two ends of the film winding shaft 17, respectively. Circular gears (pinions) 17*a* are integrated to the small diameter portions 17*b*, respectively.

On the other hand, the air conditioning case 1*a* includes the linear gears (rack) 19 disposed on the seal surface 1*c* along longitudinal end portions of the upstream opening 26*a*. The circular gears 17*a* at the two ends of the film winding shaft 17 are engaged with the linear gears formed on the air conditioning case 1*a*, respectively. The drive shaft 22 is disposed at a lateral side of any one of the lateral linear gears 19, for example, at the lateral side of upper linear gear 19 shown in FIG. 20, in parallel with the liner gears 19. Thus, the drive shaft 22 is disposed to extend perpendicularly to the film winding shaft 17. Furthermore, as shown in FIG. 21, the drive shaft 22 and the film winding shaft 17 are disposed to be positioned on the same plane.

The drive shaft 22 has a spiral ditch 22*d* on its outer peripheral surface. Since the spiral ditch 22*d* and the linear gears 19 are required to be provided in an entire movement region of the film winding shaft 17, they are provided to be longer than a longitudinal dimension of the upstream opening 26*a*. As shown in FIG. 20, the small diameter portion 17*b* of the film winding shaft 17 at the side of the drive shaft 22 extends toward the drive shaft 22, and its extension end is fitted into the spiral ditch 22*d* at a center portion in a radial direction of the drive shaft 22. The fitted position between the extension end of the small diameter portion 17*b* and the spiral ditch 22*d* of the drive shaft 22 is displaced in the axial direction of the drive shaft 22 due to the rotation of the drive shaft 22, so that a wall surface of the drive shaft 22, defining the spiral ditch 22*d*, directly pushes the extension end of the small diameter portion 17*b* of the film winding shaft 17.

Both the ends of the drive shaft 22 are rotatably supported by the bearing holes 30 provided in the air conditioning case 1*a*, as shown in FIG. 21. One end of the drive shaft 22, for example, the left end thereof shown in FIG. 20, protrudes outside the air conditioning case 1*a*, and is connected to the actuator 31 such as a step motor. Further, the film winding shaft 17 is provided in the inside-outside twofold shaft structure as in the third embodiment shown in FIG. 7, and the inside and outside shafts can be connected by the coil spring 25 shown in FIG. 7. Thus, the looseness of the film member 13 due to the wound diameter change of the film member 13 can be absorbed.

Next, operation in the seventh embodiment will be described. In the state of FIGS. 20, 21, approximately 20% of the air passage 26 is opened by the film member 13, and approximately 80% thereof is closed. In this state, when the drive shaft 22 is rotated by electrically driving of the actuator 31, the fitted position between the spiral ditch 22*d* and the extension end of the small diameter portion 17*b* is moved in the axial direction of the drive shaft 22. Thus, the wall surface of the drive shaft 22, defining the spiral ditch 22*d*, directly pushes the film winding shaft 17, thereby moving the film winding shaft 17 in the arrow direction A. Here, both the ends of the film winding shaft 17 are engaged with the linear gears 19 of the air conditioning case 1*a* through the circular gears 17*a*. Therefore, the film winding shaft 17 is moved in the arrow direction A (opening-closing direction) on the upstream opening 26*a* due to the rotation of the drive shaft 22 while being rotated, thereby changing the opening area of the air passage 26.

In the seventh embodiment, as described above, the drive shaft 22 and the film winding shaft 17 are disposed on the same plane to be perpendicular to each other, so that only the film winding shaft 17 moves in the opening-closing direction A on the upstream opening 26*a* while being rotated. Therefore, a space for moving the operation mechanism of the film winding shaft 17 can be made very small also in the air flowing direction C, thereby effectively reducing the size of the air conditioning case 1*a*. Furthermore, a movement distance of the film winding shaft 17 per rotation of the drive shaft 22 can be made larger by increasing a pitch (distance between neighboring ditches) of the spiral ditch 22*d*, as compared with that of the worm gear mechanism in the fifth embodiment shown in FIG. 11. Therefore, when the air passage opening/closing device shown in FIGS. 20, 21 is used for an air mixing door, a door position (passage opening area) can be quickly changed by using the rotation of the drive shaft 22, thereby increasing a response degree of the air blowing temperature.

(Eighth Embodiment)

In the above-described embodiments, when the wound state of the film member 13 wound around the film winding shaft 17 is maintained for a long time especially in a high temperature condition, a wound habit (transcription) is generated in the film member 13. In this case, the film winding shaft 17 is moved to the entirely closed position, so that the film member 13 is entirely wound off from the film winding shaft 17. For example, as shown in FIGS. 22A, 22B, 22C, protrusion portions 13*a* of the film member 13 protrude upward to be separated from the plane seal surface 1*c* provided on the outer peripheral portion of the upstream opening 26*a*, due to the wound habit of the film member 13.

Figure 22A:
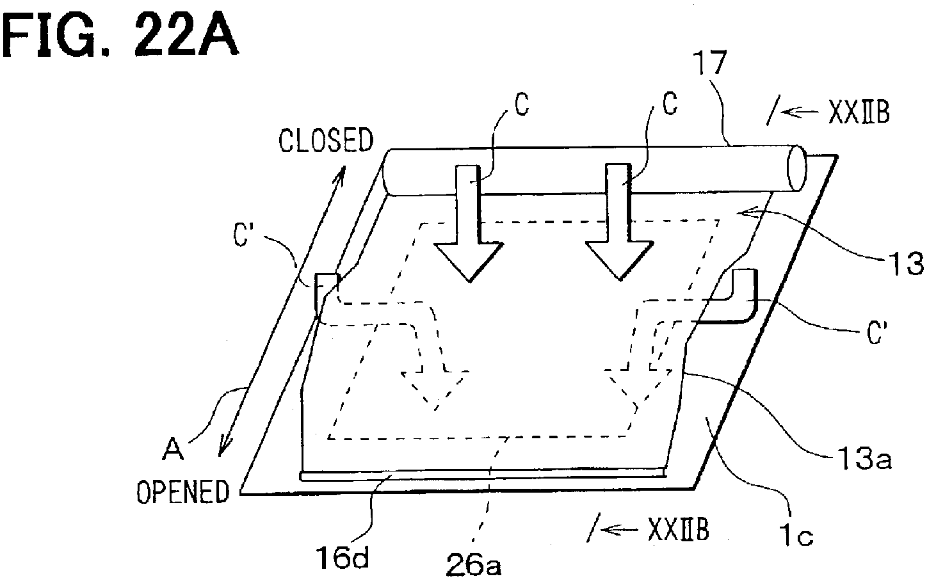
FIG. 22A is a schematic perspective diagram showing a problem to be solved in an eighth embodiment.
Figure 22B:
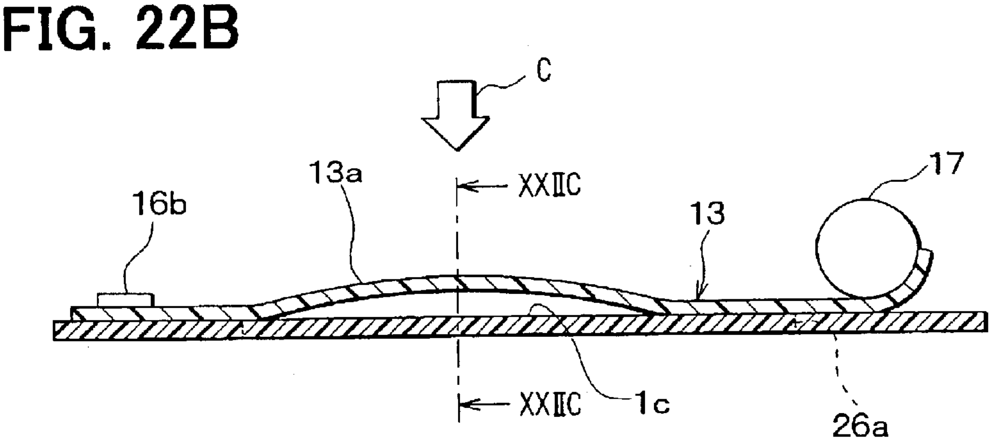
FIG. 22B is a schematic sectional diagram taken along line XXIIB—XXIIB in FIG. 22A.
Figure 22C:
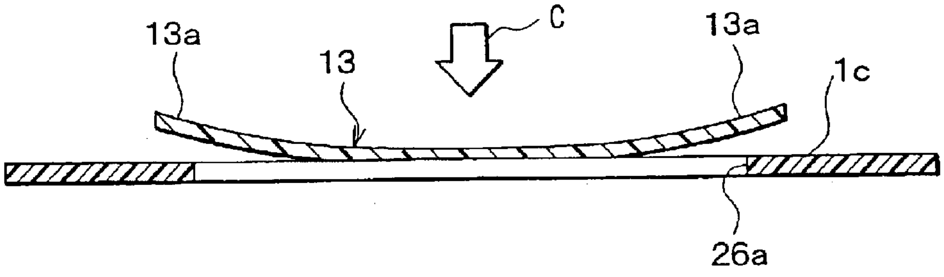
FIG. 22C is a schematic sectional diagram taken along line XXIIC—XXIIC in FIG. 22B.

As shown in FIGS. 22A, 22B, the protrusion portions 13*a* caused due to the wound habit are positioned at an intermediate portion between the fixing portions 16*d* and the film winding shaft 17 positioned at the entirely closed position. As shown in FIG. 22C, the protrusion portions 13*a* are formed in the film member 13 at both the ends in the axial direction of the film finding shaft 17. Therefore, as shown in FIG. 22A, air flows into the upstream opening 26*a* in an arrow direction C' through a clearance between the protrusion portions 13*a* separated from the seal surface 1*c* and the seal surface 1*c*, and the air leaks. Furthermore, protrusion vibration due to air pressure is generated in the protrusion portions 13*a*, so that the protrusion portions 13*a* sometimes generate abnormal noise.

Figure 23:
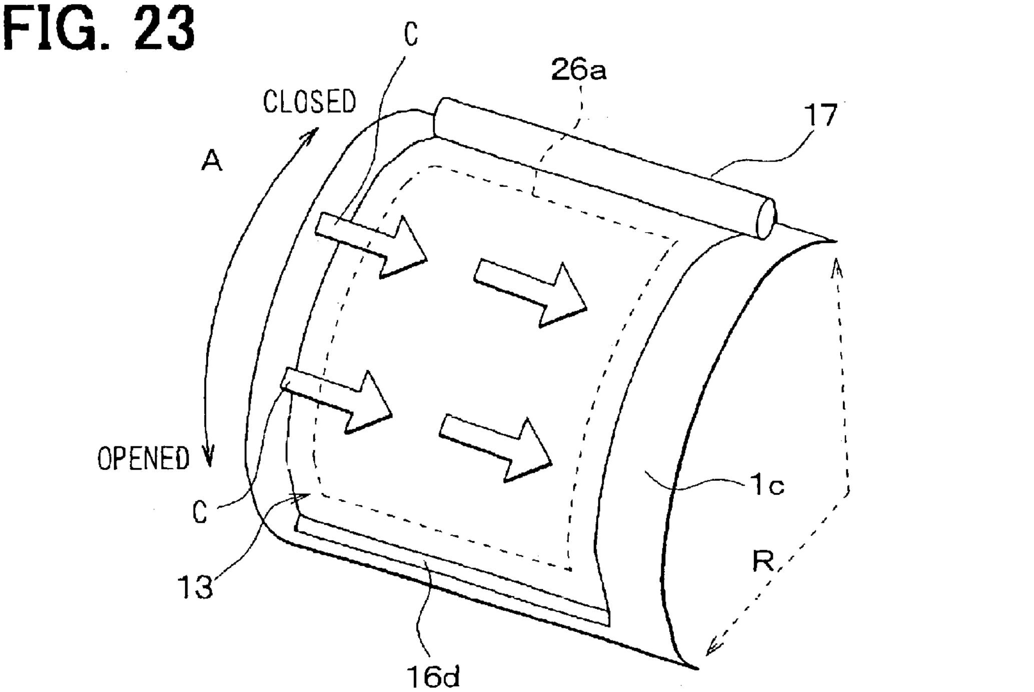
FIG. 23 is a schematic perspective view showing a main part of an air passage opening/closing device according to the eighth embodiment of the present invention.
Figure 24:
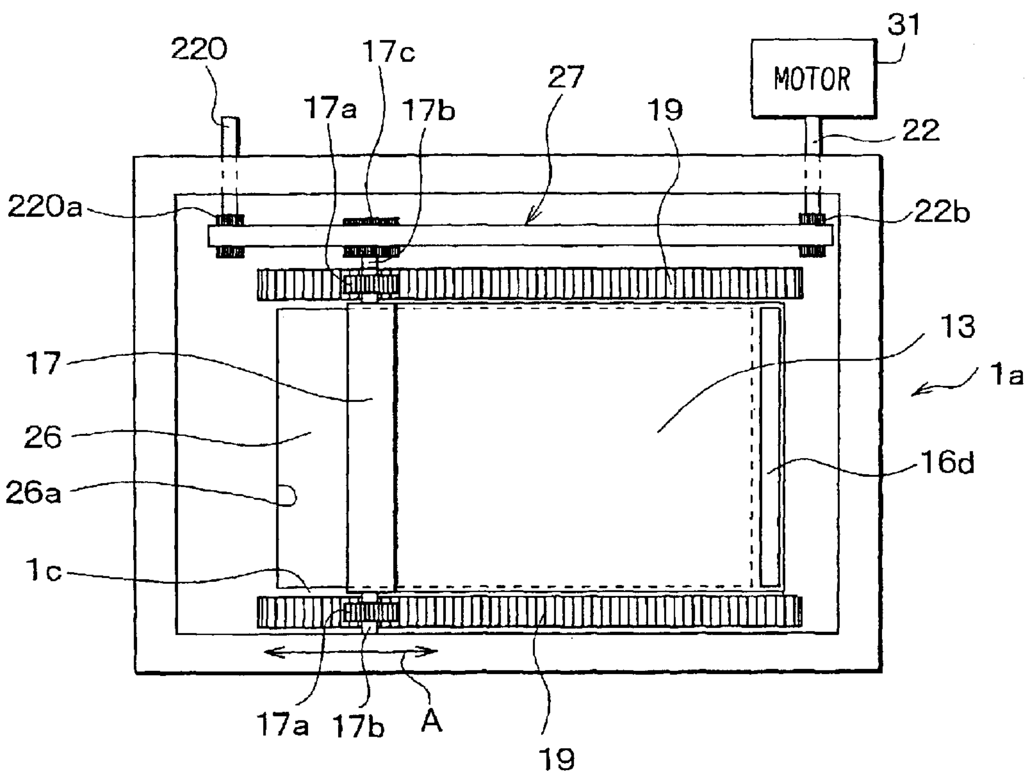
FIG. 24 is a schematic plan view showing the air passage opening/closing device according to the eighth embodiment.
Figure 25:
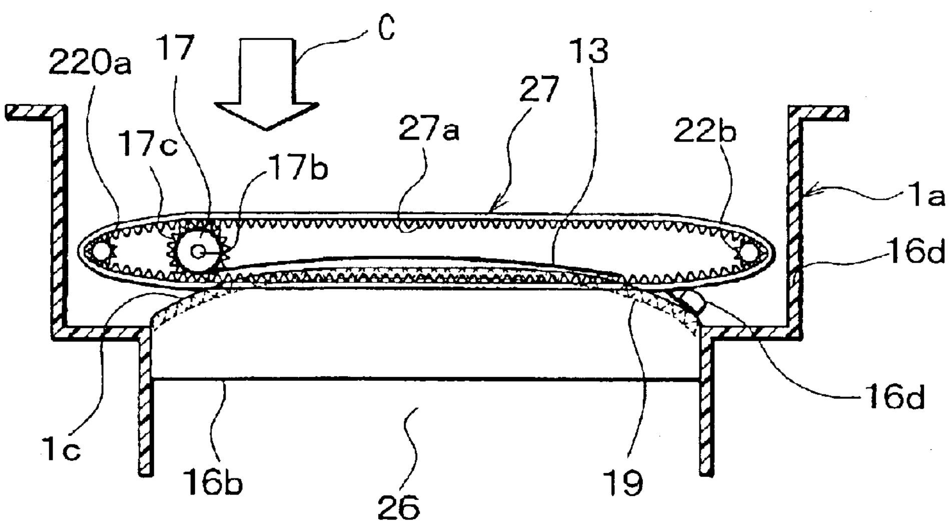
FIG. 25 is a schematic sectional view showing the air passage opening/closing device according to the eighth embodiment.

In the eighth embodiment, the air leakage and the abnormal noise due to the bending habit of the film member 13 can be restricted. As shown in FIG. 23, the seal surface 1*c* is formed to protrude in the protrusion direction of the protrusion portions 13*a* generated due to the wound habit of the film member 13. In FIG. 23, the seal surface 1*c* is formed to have a curvature radius R. Thus, the clearance between the seal surface 1*c* and the protrusion portions 13*a* is reduced, or is prevented. Specifically, the eighth embodiment is shown in FIGS. 24, 25. The protrusion portions 13*a* generally protrude upward in FIG. 25 due to the wound habit of the film member 13. Therefore, the seal surface 1*c* is also formed in a curved shape to protrude upward in FIG. 25, and the linear gears 19 are also provided in a curved shape along the seal surface 1*c*.

However, in the opening-closing direction A of the upstream opening 26*a*, the film winding shaft 17 is required to move along the curved shape of the seal surface 1*c* protruding upward, due to the engagement between the circular gears 17*a* of the film winding shaft 17 and the linear gears 19 on the seal surface 1*c*. Therefore, the operation mechanism of the film winding shaft 17 is constructed with the gear belt 27 and the like as in the fourth embodiment shown in FIGS. 9, 10. As described above, the gear belt 27 is formed in the loop shape by a flexible and elastic rubber material. The gear 27*a* is integrated by molding to the gear belt 27 along its entire outer peripheral surface in the above-described fourth embodiment. However, in the eighth embodiment, the gear is integrated to the gear belt 27 along its entire inner peripheral surface.

In the eighth embodiment, the drive shaft 22 is disposed at any one end side in the moving direction A of the film winding shaft 17, and a support shaft 220 is rotatably disposed at the other end side. The drive shaft 22 is connected to and rotated by the actuator 31, and the support shaft 220 is rotatably supported by the air conditioning case 1*a*. The circular gear 22*b* provided at the end of the drive shaft 22 and a circular gear 220*a* provided at an end of the support shaft 220 are engaged with the gear 27*a* provided on the inner peripheral surface of the gear belt 27. Thus, as shown in FIG. 25, the gear belt 27 is disposed in an elliptical loop shape to extend along an entire length in the moving direction A of the film winding shaft 17. As shown in FIG. 24, the gear belt 27 is disposed at any one side of the right and left linear gears 19 in parallel with the liner gear 19.

Furthermore, a second circular gear 17*c*, different from the first circular gear 17*a* engaged with the linear gear 19, is provided on the small diameter portion 17*b* of the film winding shaft 17. The first circular gear 17*a* is disposed at a root side of the small diameter portion 17*b*, and the second circular gear 17*c* is disposed at a top end side thereof. The second circular gear 17*c* is engaged with the gear 27*a* provided on the inner peripheral surface of the gear belt 27.

Accordingly, when the drive shaft 22 is rotated by the actuator 31, the film winding shaft 17 is rotated through the loop-shaped gear belt 27. Then, the film winding shaft 17 moves due to the engagement with the liner gears 19 in the opening-closing direction A while being rotated, so that the film member 13 is wound around and wound off from the film winding shaft 17. Further, the seal surface 1*c* is curved to protrude to the protrusion direction of the protrusion portions 13*a* due to the wound habit of the film member 13. Therefore, even if the wound habit is caused in the film member 13, the wound-habit clearance between the film member 13 and the seal surface 1*c* can be reduced, or eliminated. Thus, the air leakage and the abnormal noise can be effectively restricted from being caused due to the protrusion portions 13*a* of the film member 13. Here, a loop chain may be used in place of the gear belt 27.

In the above embodiments, the present invention is applied to the air passage opening/closing device for the vehicle air conditioner. However, the present invention can be applied to an air passage opening/closing device for another use.

Such changes and modifications are to be understood as being within the scope of the present invention as defined by the appended claims.

What is claimed is:

1. An air passage opening/closing device comprising:

a case for defining an air passage therein:

a film member disposed in the case, for opening and closing the opening of the air passage;

a fixing portion for fixing one end of the film member to the case on an outer periphery of the opening; and an operation mechanism capable of moving on the opening of the air passage in a first direction separated from the fixing portion and in a second direction approaching the fixing portion; wherein the operation mechanism changes a length of the film member from the one end of the film member by the movement of the operation mechanism on the opening of the air passage;

the operation mechanism includes a film winding shaft to which the other end of the film member opposite to the one end is connected, and a moving mechanism for moving the film winding shaft on the outer periphery of the opening in the first direction and in the second direction while rotating the film winding shaft;

the film member at a side of the other end is wound around the film winding shaft, and is unwound from the film winding shaft; and the operation mechanism further includes a rotational-angle adjusting mechanism for adjusting a rotational angle of the film winding shaft so as to compensate a diameter change of the film member wound around the film winding shaft.

2. The air passage opening/closing device according to claim 1, wherein the rotational-angle adjusting mechanism is for adjusting a phase difference between a moving distance of the moving mechanism and the rotation angle of the film winding shaft.

3. The air passage opening/closing device according to claim 2, wherein:

the rotational-angle adjusting mechanism includes a first gear provided on the film winding shaft, and a second gear provided in the case to be engaged with the first gear; and the second gear is provided such that a pitch of the second gear is made larger as a diameter of the film member wound around the film winding shaft becomes larger.

4. The air passage opening/closing device according to claim 2, wherein the rotational-angle adjusting mechanism is a spring member disposed between the moving mechanism and the film winding shaft.

5. The air passage opening/closing device according to claim 4, wherein the spring member is a coil spring for continuously applying a spring force to a portion between the moving mechanism and the film winding shaft in an entire moving region of the film winding shaft.

6. The air passage opening/closing device according to claim 1, wherein:

the case has a side wall on the outer periphery of the opening at an opposite side of the fixing portion; and the side wall extends in a direction crossing with the other end of the film member.

7. The air passage opening/closing device according to claim 6, wherein the side wall extends in a straight line.

8. The air passage opening/closing device according to claim 6, wherein the side wall extends in a curved line.

9. The air passage opening/closing device according to claim 1, wherein:

the operation mechanism further includes a drive shaft rotatably supported in the case for driving the film winding shaft; and the drive shaft extends in a direction substantially parallel to an axial direction of the film winding shaft.

10. The air passage opening/closing device according to claim 9, wherein the drive shaft is disposed substantially on a plane where the film winding shaft is located.

11. The air passage opening/closing device according to claim 9, further comprising another film winding shaft extending in parallel with the drive shaft, wherein both the film winding shafts are provided opposite to each other with respect to the drive shaft.

12. The air passage opening/closing device according to claim 11, wherein both the film winding shafts are operatively linked with each other in accordance with operation of the drive shaft.

13. An air passage opening/closing device comprising:

a case defining an air passage therein;

a film member disposed in the case, for opening and closing an opening of the air passage;

a fixing portion for fixing one end of the film member to the case on an outer periphery of the opening of the air passage;

a film winding shaft to which an other end of the film member is connected, the film member being wound around the film winding shaft from the other end and being unwound from the film winding shaft; and a drive shaft for driving the film member, the drive shaft being disposed on a plane where the film winding shaft is disposed, wherein:

the drive shaft is disposed to extend perpendicular to the film winding shaft;

the drive shaft press-contacts an end of the film winding shaft, so that a pushing force due to rotation of the drive shaft is applied to the end of the film winding shaft;

the film winding shaft is movable on the outer periphery of the opening in a first direction separated from the fixing portion and in a second direction opposite to the first direction while being rotated by the pushing force applied to the end of the film winding shaft;

when the film winding shaft moves in the first direction, the film member is unwound from the film winding shaft at a side of the other end; and when the film winding shaft moves in the second direction toward the fixing portion, the film member is wound around the film winding shaft at the side of the other end.

14. The air passage opening/closing device according to claim 13, wherein:

the drive shaft is provided with a spiral ditch on an outer peripheral surface of the drive shaft; and the end of the film winding shaft is fitted into the spiral ditch so that the pushing force is applied to the end of the film winding shaft.

15. The air passage opening/closing device according to claim 13, wherein:

the case has a first gear;

the film winding shaft has a second gear engaged with the first gear of the case; and the film winding shaft is moved in the first direction and the second direction while being rotated through an engagement between the first gear of the case and the second gear of the film winding shaft.

* * * * *